United States Patent
Gotoh et al.

(10) Patent No.: US 7,693,870 B2
(45) Date of Patent: Apr. 6, 2010

(54) INFORMATION PROCESSING APPARATUS AND METHOD, AND PROGRAM USED THEREWITH

(75) Inventors: Tomohiko Gotoh, Kanagawa (JP); Katsuhiro Takematsu, Kanagawa (JP); Chao Xu, Tokyo (JP); Osamu Hanagata, Tokyo (JP); Tamaki Kojima, Tokyo (JP); Tsunayuki Ohwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 11/523,515

(22) Filed: Sep. 20, 2006

(65) Prior Publication Data
US 2007/0081088 A1    Apr. 12, 2007

(30) Foreign Application Priority Data
Sep. 29, 2005   (JP)   ............ P2005-283369

(51) Int. Cl.
 *G06F 17/30* (2006.01)
(52) U.S. Cl. .............. 707/104.1; 707/102; 707/101
(58) Field of Classification Search ........... 382/224, 382/225
See application file for complete search history.

(56) References Cited

U.S. PATENT DOCUMENTS

| | | | |
|---|---|---|---|
| 6,360,227 B1 * | 3/2002 | Aggarwal et al. ......... 707/102 |
| 6,606,411 B1 | 8/2003 | Loui et al. | |
| 7,130,864 B2 | 10/2006 | Lin et al. | |
| 2002/0184181 A1 * | 12/2002 | Agarwal et al. ............. 707/1 |
| 2003/0084065 A1 | 5/2003 | Lin et al. | |
| 2003/0169288 A1 * | 9/2003 | Misawa ................... 345/719 |
| 2003/0198390 A1 | 10/2003 | Loui et al. | |
| 2004/0119837 A1 * | 6/2004 | Inoue ................. 348/207.99 |
| 2005/0128305 A1 * | 6/2005 | Hamasaki et al. ...... 348/207.99 |
| 2005/0243188 A1 * | 11/2005 | Anderson ................. 348/231.2 |
| 2006/0126944 A1 * | 6/2006 | Loui et al. ................ 382/224 |
| 2006/0294096 A1 * | 12/2006 | Kraus et al. ................... 707/6 |

FOREIGN PATENT DOCUMENTS

EP    0 990 996 A2    4/2000

(Continued)

OTHER PUBLICATIONS

Graham A, et al., "Time as Essence for Photo Browsing through Personal Digital Libraries", Association for Computing Machinery, Proceedings of the Second ACM/IEEE-CS Joint Conference on Digital Libraries, Portland Oregon, Jul. 14-18, 2002, vol. Conf. 2, , pp. 326-335.

(Continued)

*Primary Examiner*—Cam Y T Truong
(74) *Attorney, Agent, or Firm*—Finnegan, Henderson, Farabow, Garrett & Dunner, L.L.P.

(57) ABSTRACT

Systems and methods are disclosed for processing information. In one implementation, an image processing apparatus includes an acquisition unit that acquires two or more images to be grouped together. The images include time information as attribute information. The image processing apparatus groups the images based on whether the intervals among times represented by the time information are greater than at least one threshold value. The images are managed in the form of a binary tree structure and handled in single or different groups based on comparing a threshold value with the standard deviations of intervals among the times so as to match a user's subjective intention.

8 Claims, 19 Drawing Sheets

FOREIGN PATENT DOCUMENTS

| | | |
|---|---|---|
| JP | 10-254746 | 9/1998 |
| JP | 2000-112997 | 4/2000 |
| JP | 2001-51877 | 2/2001 |
| JP | 2001-54041 | 2/2001 |
| JP | 2001-228528 | 8/2001 |
| JP | 3246384 | 11/2001 |
| JP | 2002-191015 | 7/2002 |
| JP | 2003-298991 | 10/2003 |
| JP | 2003-303211 | 10/2003 |
| JP | 2003-330942 | 11/2003 |
| WO | WO 03/038680 | 5/2003 |
| WO | WO 2004/008344 | 1/2004 |

OTHER PUBLICATIONS

Rasoul Safavian S et al., "A Survey of Decision Tree Classifier Methodology", IEEE Transactions on Systems, Man and Cybernetics, IEEE Inc. New York, vol. 21, No. 3, May 1, 1991, pp. 660-674.

Adrian Graham, et al., "Time as Essence for Photo Browsing Through Personal Digital Libraries," pp. 326-335 (2002).

http://en.wikipedia.org/wiki/Standard_deviation, pp. 1-15 (Sep. 14, 2009).

http://en.wikipedia.org/wiki/Deviation_(statistics), pp. 1-2 (Sep. 14, 2009).

Oxford Dictionary of Statistical Terms, pp. 112, 386 (ed. Yadolah Dodge 2003).

Karl Pearson, "On the dissection of asymmetrical frequency curve," pp. 71-90 (1894).

* cited by examiner $n3_{min} = p1$
$n3_{max} = p4$ ically, a user's image capturing style, intention, and action for a user-desired grouping result greatly change depending on what kind of user captures images and on what kind of scene the user captures images. Therefore, for the user, it is difficult to achieve a desired grouping result with a fixed grouping criterion.

INFORMATION PROCESSING APPARATUS AND METHOD, AND PROGRAM USED THEREWITH

CROSS REFERENCES TO RELATED APPLICATIONS

The present invention contains subject matter related to Japanese Patent Application JP 2005-283369 filed in the Japanese Patent Office on Sep. 29, 2005, the entire contents of which are incorporated herein by reference.

BACKGROUND OF THE INVENTION

1. Field of the Invention

The present invention relates to image processing apparatuses and methods, and programs used therewith, and, in particular, to an image processing apparatus and method for grouping pieces of information so as to highly match a user's subjective intention, and a program used therewith.

2. Description of the Related Art

In recent years, various technologies for grouping images captured by a digital camera have been proposed.

For example, Japanese Unexamined Patent Application Publication Nos. 2001-54041 and 2001-51877 disclose technologies that manage captured images by grouping the images in units of image-capture dates on the basis of image-capture-date information obtained in image capturing.

Japanese Unexamined Patent Application Publication No. 2002-191015 discloses a technology that manages captured images by recording the images and image-capture-position information obtained by the GPS (Global Positioning System) or the like so that both are associated with each other and grouping the images in accordance with distances from a reference position to image-capture positions of the images. According to this technology, when an image is captured at a position close to an image-capture position of a certain captured image, the certain captured image, and the image, which is later captured, are managed as images belonging to the same group.

Japanese Unexamined Patent Application Publication No. 2003-298991 discloses a technology that manages captured images in units of events on the basis of information of events registered in a calendar and information of image-capture dates obtained in image capturing. According to this technology, when, for example, a "trip" is registered as an event occurring on a predetermined date in a calendar by a user, captured images whose image-capture dates are identical to the predetermined date are managed as images belonging to the same group.

Japanese Unexamined Patent Application Publication No. 10-254746 discloses a technology in which images captured at intervals of a predetermined time or less are managed as images belonging to the same group. According to this technology, in a case in which each interval serving as a criterion for grouping is, for example, ten minutes, when image capturing is performed within ten minutes after earlier image capturing is performed, an image obtained by the earlier image capturing and an image obtained by the later image capturing are managed as images belonging to the same group. Conversely, when image capturing is performed after a lapse of ten minutes after performing the earlier image capturing, an image captured in the earlier image capturing and an image captured in the later image capturing are managed as images belonging to different groups.

SUMMARY OF THE INVENTION

For example, in the technologies disclosed in Japanese Unexamined Patent Application Publication Nos. 2001-54041 and 2001-51877, since grouping is performed in units of image-capture dates, it is difficult to manage, as images belonging to a single group, images captured during an event, such as a trip, lasting on a plurality of days. In addition, when images that are captured during a plurality of events performed on a single date intermingle, it is difficult to manage images captured during different events as images belonging to different groups.

As disclosed in Japanese Unexamined Patent Application Publication No. 2002-191015, in a technology that needs to acquire image-capture-position information by using the GPS or the like, when it is difficult to acquire the image-capture-position information, it is obviously difficult to group captured images on the basis thereof. For example, an image whose image-capture-position information fails to be acquired is excluded from grouping.

In the technology disclosed in Japanese Unexamined Patent Application Publication No. 2003-298991, it is necessary for a user to register an event name, such as the name of a place where the user is present, in a calendar. In general, such a registering operation is cumbersome for the user.

In the technology disclosed in Japanese Unexamined Patent Application Publication No. 10-254746, each image capturing interval serving as a criterion for grouping is set to a predetermined time, and regular intervals are each used as a criterion to perform automatic grouping. Accordingly, it is difficult to perform grouping that matches a user's subjective intention such as "wishing to divide images into groups using a boundary between this image and another image".

In a case in which each regular image capturing interval serving as a criterion for grouping is, for example, ten minutes, it is preferable for the user that all images captured during a single event such as wedding be grouped as images belonging to the same group. In order for all the images to be grouped in such a manner, after the wedding begins and the user initially performs image capturing, the user needs to always perform image capturing within ten minutes. Also, unless the user performs image capturing until at least ten minutes have elapsed since the wedding finished, images captured in the middle of the wedding and images captured after the wedding finishes are grouped into the same group.

The image capturing intervals greatly change depending on individual image capturing styles. Thus, in a case in which grouping is performed by using, as a reference, a predetermined interval such as ten minutes, if only ten images are captured in total from the beginning to end of the wedding in user's image capturing, in other words, if image capturing each time is performed at intervals of ten or more minutes, a group including two or more images is not formed.

In addition, when grouping is performed, with a predetermined interval used as a reference, a criterion for grouping is fixed, so that the result of the grouping is also fixed. If the result of the grouping does not match a user-desired fineness, it is difficult to meet user's requirements such as "the need to perform grouping into slightly larger groups" and "the need to perform grouping into slightly smaller groups".

In recent years, recording media, such as a hard disk or a flash memory, have come to have a mass storage size. When a digital camera provided with such a recording medium having the mass storage size is used, it is expected that captured images are stored in an unchanged form within the digital camera without being transferred to a different device, such as a personal computer, having a storage function. Also, it is common that operation buttons provided on the digital camera are relatively small so as to ensure device portability, and it is difficult to manage the images by using the operation buttons to group the images. Accordingly, automatic grouping of the captured images in appropriate form in the digital camera is greatly in demand.

The present invention has been made in view of the above-described circumstances, and it is desirable to perform information grouping that matches a user's subjective intention.

According to an embodiment of the present invention, there is provided an information processing apparatus including acquisition means for acquiring a plurality of pieces of information to be grouped, the pieces of information including time information as attribute information, and arithmetic means for grouping the pieces of information acquired by the acquisition means so that a portion in which a level of variation of intervals among times represented by the time information included in the pieces of information is greater than at least one threshold value is used as a boundary between groups.

When the pieces of information are images, the time information may represent image-capture times.

The arithmetic means may use the plurality of threshold values for the same pieces of information acquired by the acquisition means to obtain a plurality of grouped results which respectively have different finenesses.

The arithmetic means may manage the pieces of information in the form of a binary tree structure, and, by comparing, with the threshold value, a ratio between a standard deviation of intervals among times represented by time information included in information in a node of interest and a deviation of intervals among times of child nodes having the node of interest as a parent node, the arithmetic means may perform grouping so that pieces of information in the child nodes are handled as pieces of information in different groups or as information in a single group.

The information processing apparatus may further include display control means for displaying, on the basis of the groups obtained by the arithmetic means, in a list form, pieces of information which belong to each group.

The display control means may respectively display the groups in the form of folders, and may display, in a list form, pieces of information which belong to a group represented by a folder selected by a user from the displayed folders.

The information processing apparatus may further include setting means for setting, as a name for each of the folders, a name input by the user or a name obtained from attribute information included in information belonging to each of the groups.

According to another embodiment of the present invention, there is provided an information processing method or program including the steps of acquiring a plurality of pieces of information to be grouped, the pieces of information including time information as attribute information, and grouping the acquired pieces of information so that a portion in which a level of variation of intervals among times represented by the time information included in the pieces of information is greater than at least one threshold value is used as a boundary between groups.

According to an embodiment of the present invention, a plurality of pieces of information to be grouped are acquired, the pieces of information including time information as attribute information, and the pieces of information are grouped so that a portion in which a level of variation of intervals among times represented by the time information included in the pieces of information is greater than at least one threshold value is used as a boundary between groups.

According to an embodiment of the present invention, information grouping can be performed so as to highly match a user's subjective intention.

DESCRIPTION OF THE PREFERRED EMBODIMENT

Figure 1:
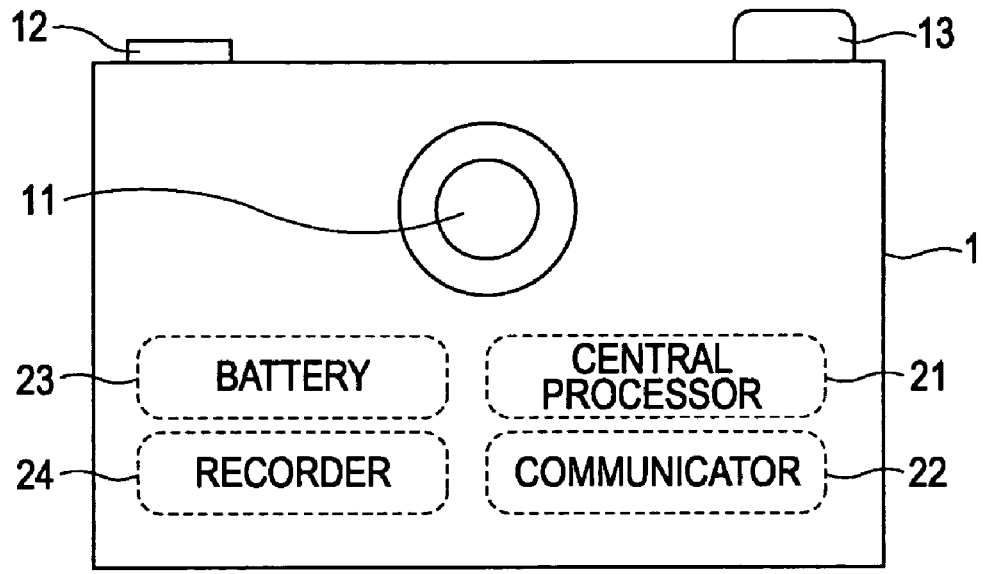
FIG. 1 is a front view showing an example of the exterior of a digital camera according to an embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An information processing apparatus (e.g., the digital camera 1 in FIG. 1) according to an embodiment of the present invention includes acquisition means (e.g., the capturing unit 32 in FIG. 7) for acquiring a plurality of pieces of information (e.g., images obtained in image capturing) to be grouped, the pieces of information including time information (e.g., image-capture-time information included in each EXIF tag) as attribute information, and arithmetic means (e.g., the arithmetic unit 35 in FIG. 7) for grouping the pieces of information acquired by the acquisition means so that a portion in which a level of variation of intervals among times represented by the time information included in the pieces of information is greater than at least one threshold value is used as a boundary between groups.

The arithmetic means can manage the pieces of information in the form of a binary tree structure, and, by comparing, with the threshold value, a ratio (e.g., division parameter th represented by expression (2)) between a standard deviation (e.g., the standard deviation sd calculated by expression (1)) of intervals among times represented by time information included in information in a node of interest and a deviation (e.g., deviation dev calculated by expression (2)) of intervals among times of child nodes having the node of interest as a parent node, the arithmetic means can perform grouping so that pieces of information in the child nodes are handled as pieces of information in different groups or as information in a single group.

This information processing apparatus may further include display control means (e.g., the browsing view display unit 39 in FIG. 7) for displaying, on the basis of the groups obtained by the arithmetic means, in a list form, pieces of information which belong to each group.

In addition, this information processing apparatus may further include setting means (e.g., the event name setting unit 38 in FIG. 7) for setting, as a name for each of the folders, a name input by the user or a name obtained from attribute information (e.g., image-capture-date information included in each EXIF tag) included in information belonging to each of the groups.

An information processing method or program according to another embodiment of the present invention includes the steps of acquiring (for example, step S1 in FIG. 24) a plurality of pieces of information to be grouped, the pieces of information including time information as attribute information, and grouping (for example, step S11 in FIG. 24) the acquired pieces of information so that a portion in which a level of variation of intervals among times represented by the time information included in the pieces of information is greater than at least one threshold value is used as a boundary between groups.

An embodiment of the present invention is described below with reference to the accompanying drawings.

Figure 2:
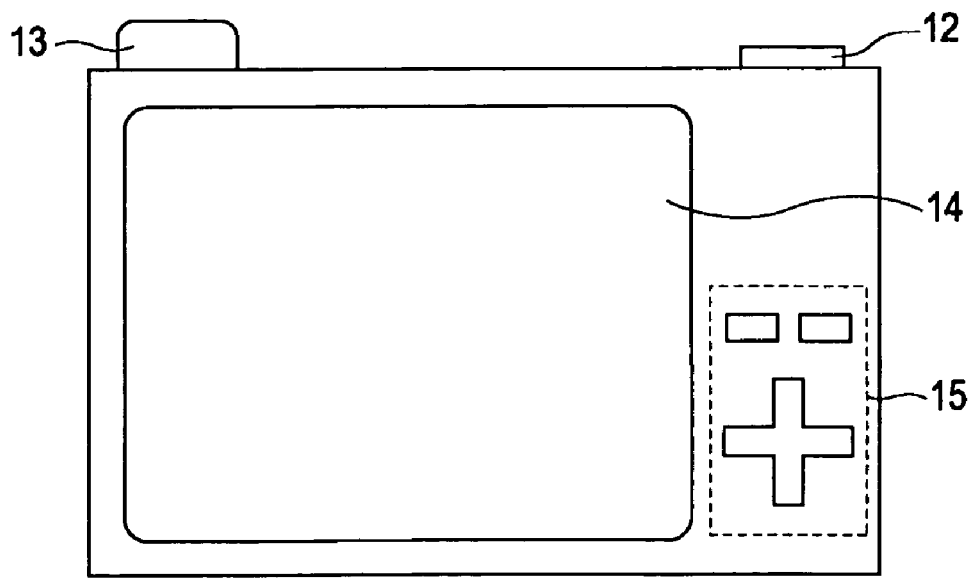
FIG. 2 is a back view showing an example of the exterior of the digital camera shown in FIG. 1.

FIGS. 1 and 2 show examples of exterior views of a digital camera 1 according to an embodiment of the present invention.

FIG. 1 is a front view (side viewed from a subject) of the digital camera 1, and FIG. 2 is a back view (side viewed from a photographer) of the digital camera 1. In FIG. 1, built-in functional units of the digital camera 1 are partly shown by the dotted lines.

As shown in FIG. 1, a lens unit 11 is provided approximately in the center of the front of the digital camera 1, and the lens unit 11 is used to capture images of the subject. On a top surface of the digital camera 1, when the front of the digital camera 1 is viewed from the subject, a shutter button 12 is provided on the left side and an antenna 13 is provided on the right side. The antenna 13 is used, for example, when the digital camera 1 wirelessly communicates with a different device.

As shown in FIG. 2, on a back surface of the digital camera 1, a display 14 formed by an LCD (liquid crystal display) is provided so as to occupy a large area on the back surface. The display 14 displays an image or images of the subject which are captured through the lens unit 11 in image capturing. After the image capturing finishes, a captured image (picture) is displayed in response to a user's operation. As described later, in the digital camera 1, captured images are grouped in units of events. Accordingly, by selecting one group, the user can control the digital camera 1 to display images captured during a predetermined event.

Operation buttons 15 include a cross key and a determination button. The operation buttons 15 are operated by the user in cases such as when the user moves a cursor displayed on the display 14 and when an item selected by the cursor is determined.

The digital camera 1, which has the above-described exterior, includes a CPU (central processing unit) and a ROM (read-only memory). Specifically, the digital camera 1 includes a central processor 21 for controlling an entire operation of the digital camera 1, a communicator 22 for performing wired or wireless communication with a different device, a battery 23 used as a power supply for driving each unit of the digital camera 1, and a recorder 24 formed by a flash memory or hard disk. The recorder 24 may be formed by a removable unit for the digital camera 1.

Image grouping (clustering) performed in the digital camera 1 having the above-described configuration is described below.

Figure 3:
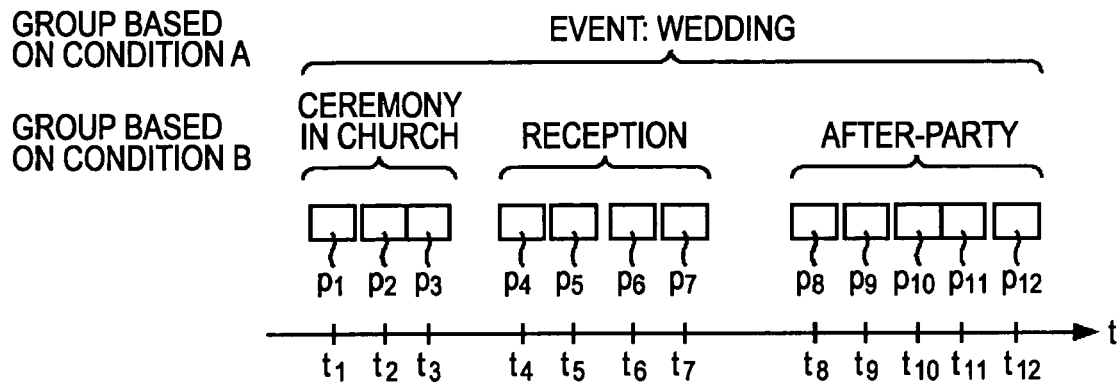
FIG. 3 is an illustration of examples of clusters.

FIG. 3 is an illustration of an example of groups (clusters) of images. In FIG. 3, a horizontal axis indicates a time base.

FIG. 3 shows a case in which images $p_1$ to $p_{12}$ captured at times $t_1$ to $t_{12}$ are used as images to be subject to clustering. For example, all images recorded in the recorder 24 after being captured are to be subject to clustering. In FIG. 3, one rectangle indicates one image.

In the digital camera 1, intervals among the image-capture times of the images are found, and one cluster is formed from consecutive images in which a distribution of the intervals satisfies a condition. An EXIF (Exchangeable Image File) tag is added as attribute information to each captured image, and image-capture-time information included in the EXIF tag is used for clustering.

In the case in FIG. 3, conditions A and B are set as cluster-prescribing conditions. Condition A prescribes a cluster including all images $p_1$ to $p_{12}$. In a cluster prescribed by condition A, an event whose name is "wedding" is set.

Details of clustering are described later. The cluster in which the event whose name is "wedding" is set is based on a point such as the fact that the level of variation in interval of the image-capture times of images $p_1$ to $p_{12}$ is less than a threshold value.

Also, in the case in FIG. 3, condition B prescribes one cluster including images $p_1$ to $p_3$ among images $p_1$ to $p_{12}$ and one cluster including images $p_4$ to $p_7$ among images $p_1$ to $p_{12}$. Condition B also prescribes one cluster including images $p_8$ to $p_{12}$.

For the cluster including images $p_1$ to $p_3$, "ceremony in church" is set as an event name. For the cluster including images p4 to p7, "reception" is set as an event name. For the cluster including images $p_8$ to $p_{12}$, "after-party" is set as an event name.

In the cluster for which the event name "ceremony in church" is set, the image-capture times of images $p_1$ to $p_3$ included in the cluster have close variation in interval. Unlike that, there is a relatively large interval between image $p_3$ and the first image $p_4$ in the next (on the time base) group of images $p_4$ to $p_7$ which form a set of images having close variation in interval among image-capture times. On the basis of the portion having the relatively large interval, it is determined that there is a change in image capturing frequency.

In the cluster for which the event name "reception" is set, the image-capture times of images $p_4$ to $p_7$ included in the cluster have close variation. Unlike that, there is a relatively large interval between image $p_7$ and the first image $p_8$ in the next (on the time base) group of images $p_8$ to $p_{12}$ which form a set of images having close variation in interval among image-capture times. On the basis of the portion having the relatively large interval, it is determined that there is a change in image capturing frequency.

In the cluster for which the event name "after-party" is set, the image-capture times of images $p_8$ to $p_{12}$ included in the cluster have close variation. Unlike that, there is a relatively large interval between image $p_{12}$ and the first image in the next (on the time base) group of images which form a set of images having close variation in interval among image-capture times. On the basis of the portion having the relatively large interval, it is determined that there is a change in image capturing frequency.

The event names "ceremony in church", "reception", and "after-party" are, for example, manually set by the user.

As described above, in the digital camera 1, a plurality of conditions are set for performing clustering on images of the subject, and, on the basis of the conditions, clusters corresponding to different finenesses are prescribed. In the case in FIG. 3, condition A prescribes a low (coarse) fineness cluster, while condition B prescribes a high (fine) fineness cluster.

The images included in the above-described clusters are collectively managed in a virtual folder, and are displayed in a form having a hierarchical structure.

Figure 4:
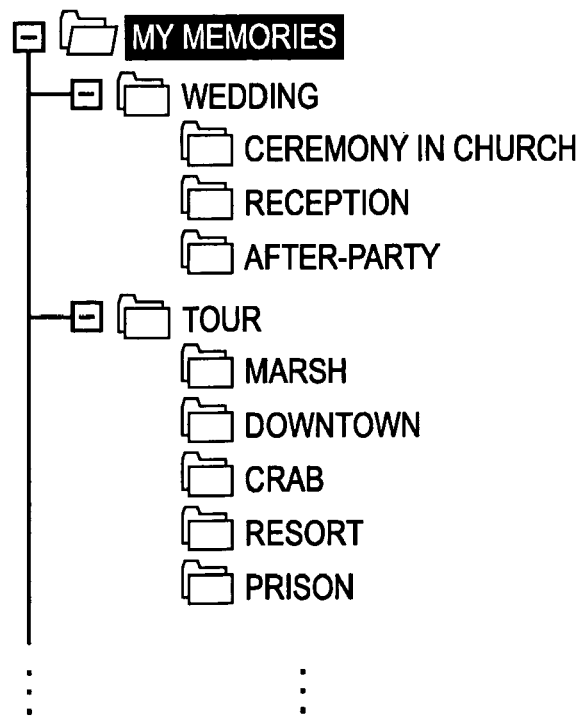
FIG. 4 is an illustration of an example of a hierarchical structure.

FIG. 4 is an illustration of an example of a hierarchical structure.

In the example in FIG. 4, in a folder for which "my memories" is set as a folder name, as lower layer folders, a folder representing the cluster which is prescribed by condition A and for which the event name "wedding" is set, and a folder representing a cluster which is prescribed by condition A and for which the event name "tour" is set are shown.

Also, in the folder for which the event name "wedding" is set, as lower layer folders, folders which are prescribed by condition B and for which "ceremony in church", "reception", and "after-part" are set are shown.

In addition, in the cluster for which the event name "tour" is set, as lower layer folders, folders representing clusters which are prescribed by condition B and for which the event names "marsh", "downtown", "crab", "resort", and "prison" are set are shown. The clusters represented by the above folders are also prescribed by distribution of intervals among the image-capture times of images included in the clusters.

As described above, in the digital camera 1, folders are created in units of events, and images captured are included during each event. Thus, by selecting a predetermined folder from the folders, which have a hierarchical structure, the user can view and set images in order in units of events.

Figure 5:
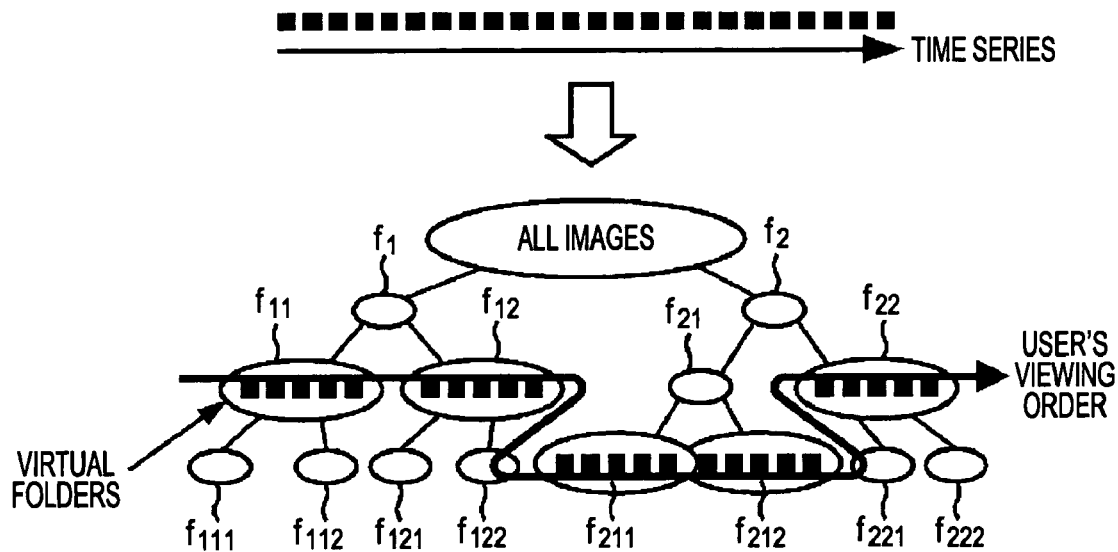
FIG. 5 is an illustration of image viewing order.

For example, instead of simply viewing captured images in chronological order as shown at the top of FIG. 5, as denoted by the hollow arrow, the user can view the images in order of images included in folders $f_{11}$, $f_{12}$, $f_{122}$, $f_{211}$, $f_{212}$ and $f_{22}$. In other words, the user can select folders having fineness of preference and can view images in order of preference.

In FIG. 5, one ellipse indicates one folder. As shown in FIG. 5, all the captured images are divided into images included in folder $f_1$ and images included in folder $f_2$. The images included in folder $f_1$ are further divided into images included in folder $f_{11}$ and images included in folder $f_{12}$. The images included in folder $f_{11}$ are further divided into images included in folder $f_{111}$ and images included in folder $f_{112}$. The images included in folder $f_{12}$ are further divided into images included in folder $f_{112}$ and images included in folder $f_{122}$. Similarly, the images in folder $f_2$ are also divided into images included in lower layer folders.

Figure 6:
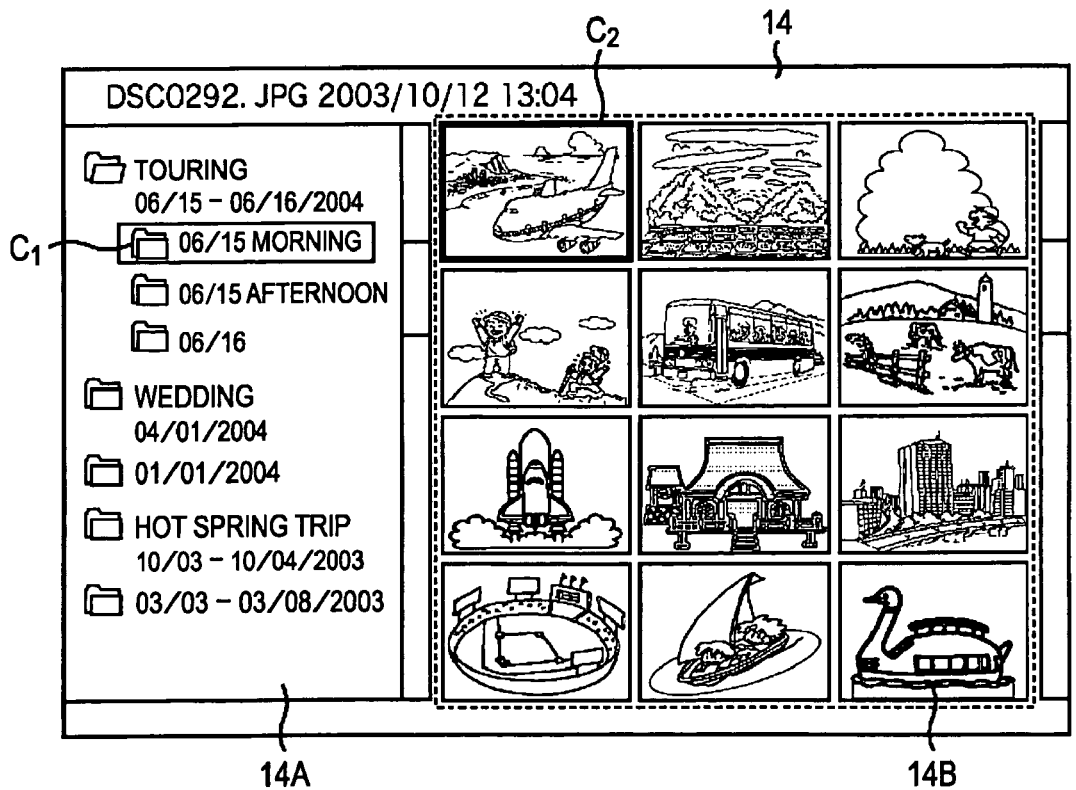
FIG. 6 is an illustration of an example of a browsing screen.

FIG. 6 shows an example of a browsing screen displayed on the display 14.

As shown in FIG. 6, the browsing screen includes a folder display region 14A formed on the left side of the screen and an image display region 14B formed on the right side of the screen.

In the folder display region 14A, the above folders representing the above-prescribed clusters are displayed.

In the example in FIG. 6, the folder display region 14A displays, in the same layer, folders (representing clusters) for which the event names "touring", "wedding", "01/01/2004", "hot spring trip", and "03/03-03/08/2003" are set. Since the folders are displayed in the same layer, the clusters represented by these folders are prescribed by the same condition.

Among the event names set for these folders, "touring", "wedding", and "hot spring trip" are manually set by the user, while "01/01/2004" and "03/03-03/08/2003" are automatically set in the digital camera 1 on the basis of, for example, information of image-capture dates of the images included in the corresponding folders without being set on the basis of a user's input. An EXIF tag added to each image also includes image-capture-date information.

Specifically, the folder for which the event name "01/01/2004" is set includes images captured on Jan. 1, 2004, and the folder for which the event name "03/03-03/08/2003" is set includes images captured from Mar. 3 to Mar. 8 in 2003.

The characters "06/15-06/16/2004" displayed below "touring" and the characters "01/01/2004" displayed below "wedding" are also automatically set and displayed for representing the image-capture dates of the images included in the corresponding folders.

By pressing vertical button portions of the cross key included in the operation buttons 15 to move a cursor $C_1$, a predetermined folder can be selected from the folders displayed as described above.

In the example in FIG. 6, the folder for which the event name "touring" is set is selected. Below the selected folder, lower layer folders, that is, folders for which "06/15 morning", "06/15 afternoon", and "06/16" are set are displayed. Since the folders for which "06/15 morning", "06/15 afternoon", and "06/16" are set are displayed as folders in the same layer, the clusters represented by these folders are prescribed by the same condition.

Also, in the example in FIG. 6, from the folders representing the lower layer clusters below "touring", the folder for which the event name "06/15 morning" is set is selected by using the cursor $C_1$, and images included in "06/15 morning" are displayed in a list (thumbnail) form in the image display region 14B.

In the example in FIG. 6, twelve images are displayed in list form in the image display region 14B. Among the twelve images, the top left image is selected by using a cursor $C_2$ is selected and the file name and image-capture date and time of the selected image are displayed at the top of the browsing screen.

By moving the cursor $C_2$ and pressing the determination button included in the operation buttons 15, the image being selected by using the cursor $C_2$ can be displayed so as to be enlarged to the entirety of the screen of the display 14.

An operation of the digital camera 1 which manages images and displays the browsing screen, as described above, is described later with reference to flowcharts.

Figure 7:
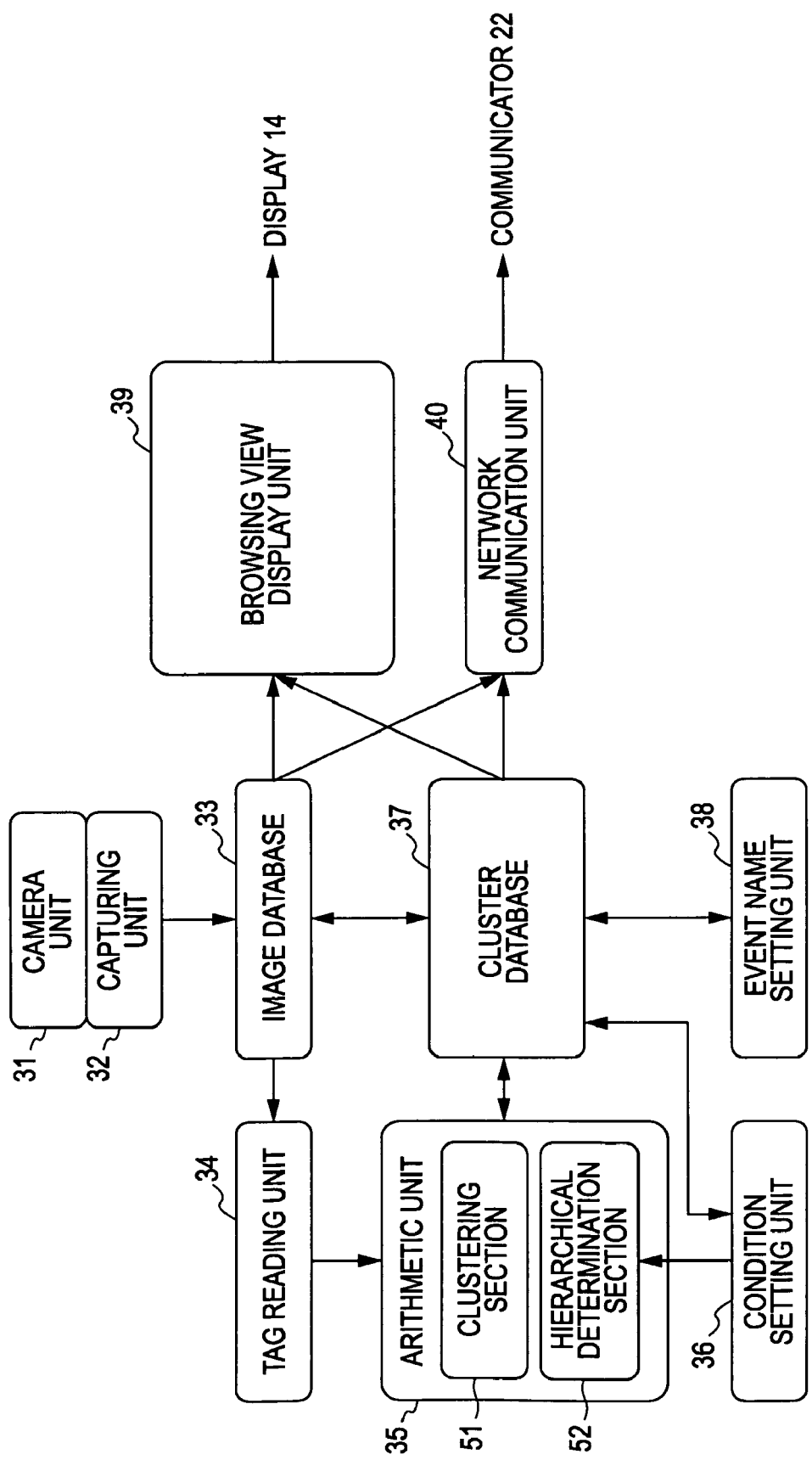
FIG. 7 is a block diagram showing an example of a functional configuration of the digital camera.

FIG. 7 is a block diagram showing an example of a functional configuration of the digital camera 1. At least part of the functional units shown in FIG. 7 is realized such that the central processor 21 in FIG. 1 executes a predetermined program.

A camera unit 31 includes the lens unit 11, which collects light from the subject, optical modules such as a diaphragm, and an image capturing element such as a CCD (charge coupled device). By receiving and photoelectrically converting light incident from the subject through the lens unit 11, the image capturing element in the camera unit 31 outputs an analog image signal as an electric signal in accordance with the amount of the received light to a capturing unit 32.

The capturing unit 32 performs analog-to-digital conversion on the image signal supplied from the image capturing element of the camera unit 31, and outputs and records digital signal image data obtained by the analog-to-digital conversion in an image database 33. Then, the capturing unit 32 records, in the image database 33, EXIF tags including information, such as image-capture times and image-capture dates, in a form associated with captured images.

In the image database 33, the images supplied from the capturing unit 32 are recorded so as to be associated with the EXIF tags.

When image clustering is performed, from the EXIF tags recorded in the image database 33, the tag reading unit 34 reads the image-capture times of images which are to be subject to clustering, and outputs the read image-capture times to an arithmetic unit 35. The image clustering may be performed whenever each image is captured and may be performed with predetermined timing such as when clustering is directed by the user.

The arithmetic unit 35 includes a clustering section 51 and a hierarchical determination section 52. After acquiring cluster data recorded in a cluster database 37, the clustering section 51 performs image clustering on the basis of the acquired cluster data and the image-capture times supplied from the tag reading unit 34. For example, a clustering result in which all the images are managed having a binary tree structure, including images subject to clustering in the past, are acquired by the clustering section 51.

The cluster data recorded in the cluster database 37 includes information which indicates to which of clusters each image belongs to, and information representing the binary tree structure of all the images, both being already obtained.

On the basis of the binary tree structure information as the clustering result acquired by the clustering section 51, the hierarchical determination section 52 determines a cluster satisfying a condition set in a condition setting unit 36. For example, information, such as information indicating which images each cluster includes, or information indicating to which of clusters each image belongs to, is acquired to represent the binary tree structure of all the images by the hierarchical determination section 52, and the acquired information is recorded, as cluster data representing a final clustering result, in the cluster database 37.

The condition setting unit 36 sets and outputs, to the hierarchical determination section 52, a grouping condition for prescribing a cluster. The grouping condition may be set such that the user selects a condition from a plurality of prepared conditions. In a case in which a history of user-implemented cluster editing, such as combining clusters into one cluster and dividing one cluster into clusters, is managed, a condition may be dynamically set in which a cluster corresponding to a gain size can be obtained, the gain size being considered to meet a user's preference and being found in learning by using the history of editing.

The cluster database 37 records the cluster data supplied from the hierarchical determination section 52 so as to be associated with the image data recorded in the image database 33. For clusters obtained by clustering, the event names supplied from the event name setting unit 38 are also associated with the clusters when being recorded. As described above, in the digital camera 1, the image data itself and the cluster data are separately managed.

The event name setting unit 38 outputs and records an event name set by the user in the cluster database 37 in a form associated with the clusters. In addition, when no event name is set by the user, the event name setting unit 38 uses the cluster data recorded in the cluster database 37 to identify images belonging to each cluster, and records event names including image-capture dates and time zones (such as morning and afternoon) of the identified images so as to be associated with the clusters.

On the basis of the cluster data read from the cluster database 37 and the event names of the clusters, a browsing view display unit 39 hierarchically displays folders representing the clusters in the folder display region 14A on the browsing screen. Also, when a predetermined folder is selected from the folders displayed in the folder display region 14A, the browsing view display unit 39 displays, in a list form, images (images included in the cluster represented by the selected folder) included in the selected folder in the image display region 14B on the basis of data recorded in the image database 33.

A network communication unit 40 controls the communicator 22 to communicate with the external device for the digital camera 1. The network communication unit 40 transmits, for example, the image data recorded in the image database 33 and the cluster data recorded in the cluster database 37 to the external device.

Details of processing performed in the arithmetic unit 35 are described below.

A process in which, for example, 100 images p1 to p100, are subject to clustering and are divided into event cluster A (a cluster of images satisfying grouping condition A) and sub-event cluster B (a cluster of images satisfying grouping condition B) is described below.

At first, creation of a binary tree structure by the clustering section 51 is described with reference to FIGS. 8 to 16.

In FIGS. 8 to 16, one circle in which the letter "p" and a numeral are written indicates one image, and one circle in which the letter "n" and a numeral are written indicates one node. In addition, in each figure, the right side is temporally subsequent to the left side. A case in which images p1 to p100 are subject to clustering in order of image-capture times (image p1 is the oldest data and image p100 is the latest data) is described below. A case is described later in which, after images p1 and p2 are used for clustering (after both images are incorporated into the binary tree structure), clustering is performed not in order of image-capture times but for each image so that new image p3, which is newer than image p1 and is older than image p2, is used for clustering.

Figure 8:
FIG. 8 is an illustration of creation of a binary tree structure.

In a state in which clustering has not been performed yet, when image p1, which is initially captured, is inserted in the tree (when image p1 is used for clustering), a node that serves as a root of the tree does not exist in an initial state. Thus, as shown in FIG. 8, image p1 itself serves as a root node.

Figure 9:
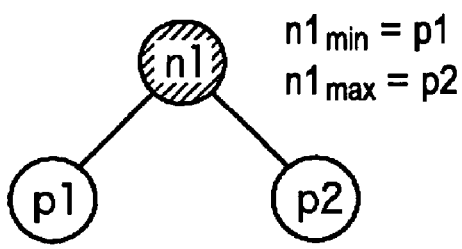
FIG. 9 is an illustration, of creation of the binary tree structure, following FIG. 8.

When image p2, captured following image p2, is inserted in the tree, as shown in FIG. 9, new node n1 is created. The image-capture time of image p2 follows the image-capture time of image p1. Thus, image p1 is connected as a left child node to node n1, and image p2 is connected as a right child node to node n1. Node n1 serves as the root node instead of image p1.

The image-capture time of image p1 is recorded as the minimum time of node n1, and the image-capture time of image p2 is recorded as the maximum time. As a time of a node, the mean (intermediate time) of image-capture times of two child nodes having node n1 as a parent node may be recorded.

Figure 10:
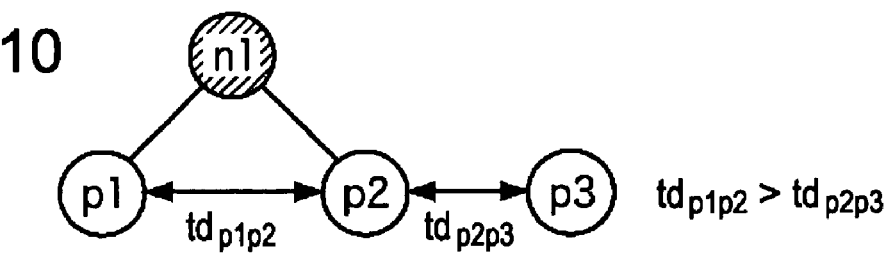
FIG. 10 is an illustration, of creation of the binary tree structure, following FIG. 9.
Figure 11:
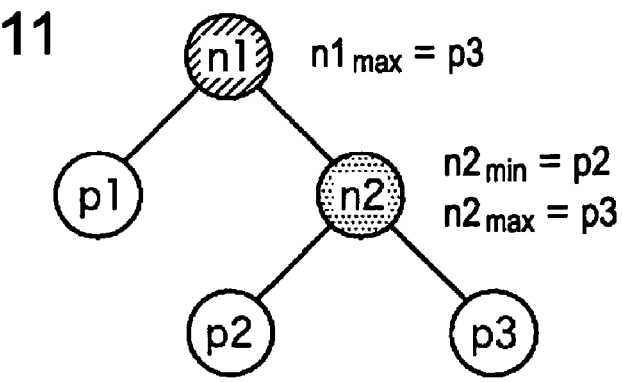
FIG. 11 is an illustration, of creation of the binary tree structure, following FIG. 10.
Figure 12:
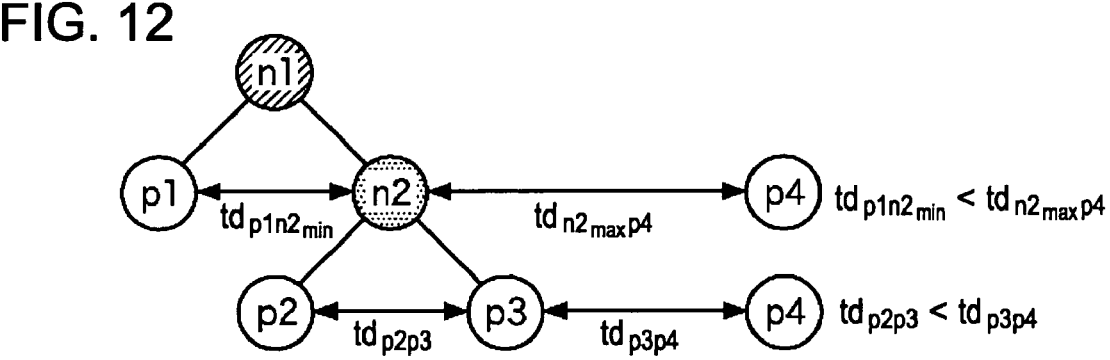
FIG. 12 is an illustration, of creation of the binary tree structure, following FIG. 11.

When image p3, captured following image p2, is inserted in the tree, and, as shown in FIG. 10, interval $td_{p2p3}$ between the image-capture times of images p3 and p2 is less than interval $td_{p1p2}$ between the image-capture times of images p2 and p1, as shown in FIG. 11, new node n2 is created and images p2 and p3 are connected as left and right child nodes to node n2, respectively. Also, node n2 is connected as a right child node to node n1 instead of image p2.

The minimum time of node n2 is recorded as the image-capture time of image p2, and the maximum time of node n2 is recorded as the image-capture time of image p3. Then, the maximum time of node n1 that is the parent node for node n2 is overwritten by the image-capture time of image p3.

Figure 13:
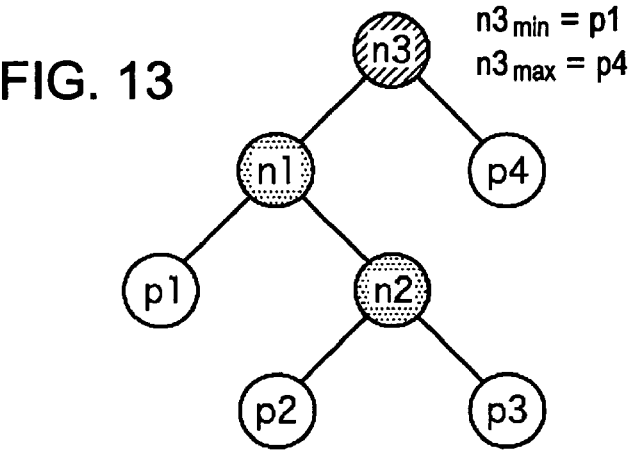
FIG. 13 is an illustration, of creation of the binary tree structure, following FIG. 12.

In a case in which, after image p4 captured following image p3 is inserted in the tree, when interval $td_{p3p4}$ between the image-capture times of images p4 and p3 is greater than interval $td_{p2p3}$ between interval between the image-capture times of images p3 and p2, and interval $td_{n2maxp4}$ between the image-capture time of image p4 and the maximum time of node n2 is greater than interval $td_{p1n2min}$ between the minimum time of node n2 and the image-capture time of image p1, new node n3 is created as the root node, as shown in FIG. 13. In addition, node n1 is connected as a left child node to node n3, and image p4 is connected as a right child node to node n3.

The minimum time of node n1 is recorded as the minimum time of node n3, and the image-capture time of image p4 is recorded as the maximum time of the node n3.

Figure 14:
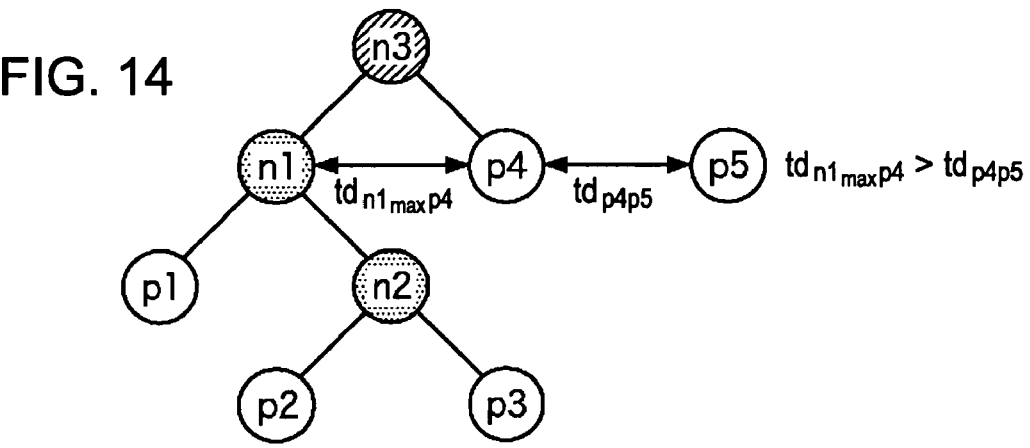
FIG. 14 is an illustration, of creation of the binary tree structure, following FIG. 13.
Figure 15:
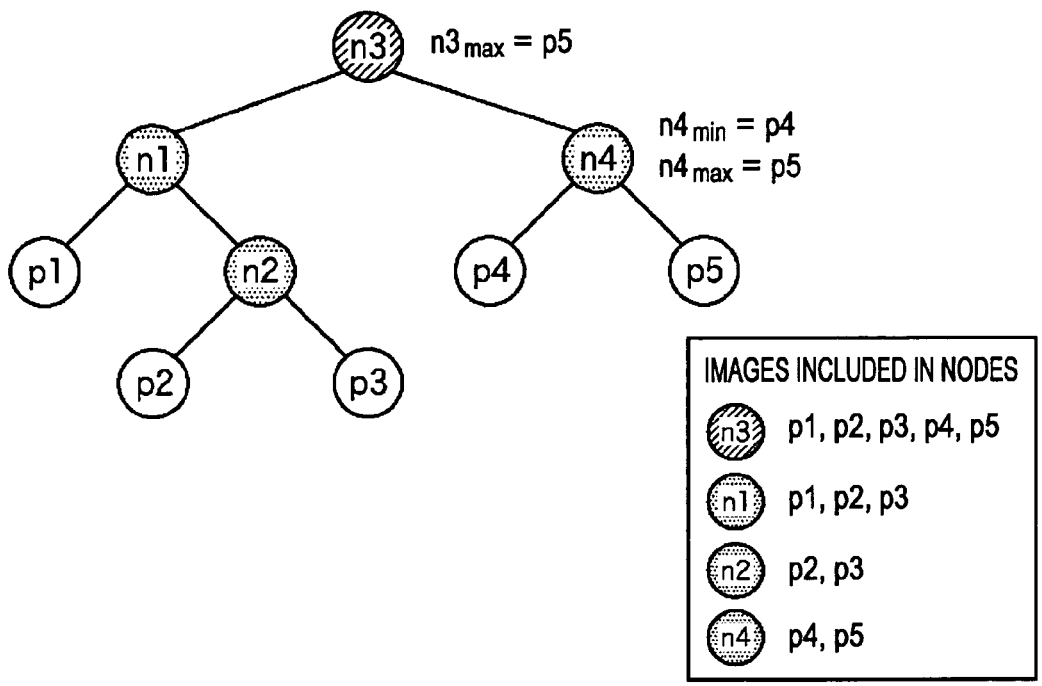
FIG. 15 is an illustration, of creation of the binary tree structure, following FIG. 14.

When image p5 captured following image p4 is inserted in the tree, and, as shown in FIG. 14, interval $td_{n1maxp4}$ between the image-capture time of image p4 and the maximum time of node n1 is greater than interval $td_{p4p5}$ between the image-capture times of images p5 and p4, new node n4 is created, as shown in FIG. 15. In addition, image p4 is connected as a left child node to node n4, and image p5 is connected as a right child node. Also, node n4 is connected as a right child node to node n3 instead of image p4.

The image-capture time of image p4 is recorded as the minimum time of node n4, and the image-capture time of image p5 is recorded as the maximum time of node n4. Then, the maximum time of node n3 that is a parent node for node n4 is overwritten by the image-capture time of image p5.

At this point, the clustering section 51 creates a state with the binary tree structure formed from nodes n1 to n4 including five images p1 to p5.

Each image included in each node is directly connected to the node, or is indirectly connected to the node via another node. Thus, when the tree shown in FIG. 15 is created, node n3 includes five images, that is, images p1 to p5, and node n1 includes three images, that is, images p1 to p3. In addition, node n2 includes two images, that is, images p2 and p3, and node n4 includes two images, that is, images p4 and p5.

As described above, whenever a new image is inserted, images in which an interval of their image-capture times is less, or an image in which an interval of its image-capture time and a set time is less, and a node are connected so as to dangle from the same node.

Figure 16:
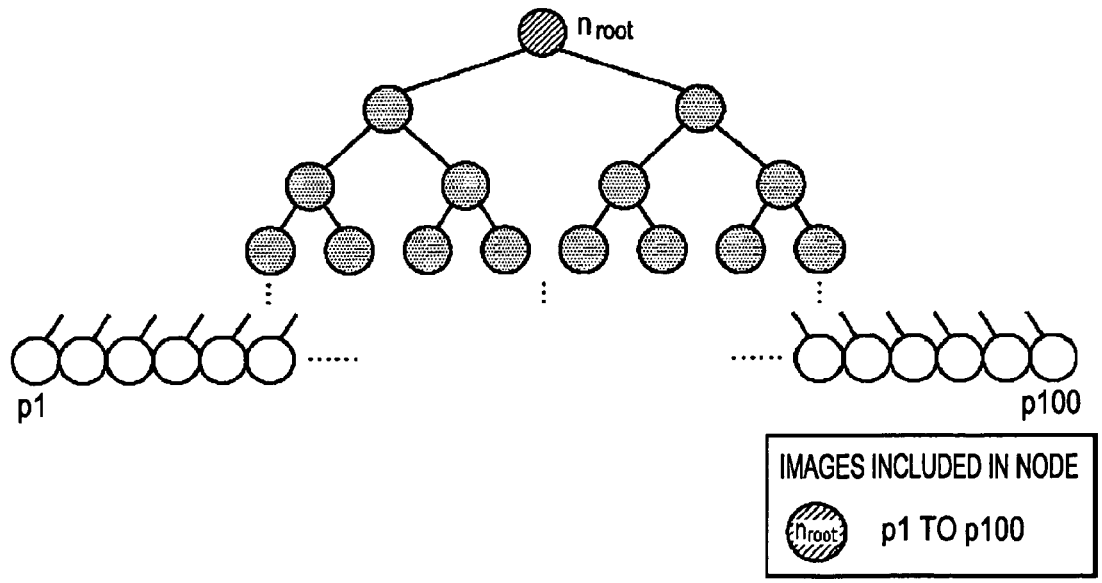
FIG. 16 is an illustration, of creation of the binary tree structure, following FIG. 15.

When images p6 to p100 are inserted in the tree by repeatedly performed image capturing, similar processing is performed, and the binary tree structure shown in FIG. 16 is finally obtained in which root node $n_{root}$ includes images p6 to p100.

Next, clustering performed by the hierarchical determination section 52 on the basis of grouping conditions is described below with reference to FIGS. 17 to 23.

In the hierarchical determination section 52, by noting each node in the binary tree structure, standard deviation sd of intervals among times of all images in the node is calculated by $$sd = \sqrt{\frac{\sum_{n=1}^{N}(td_n - \overline{td})^2}{N}} \quad (1)$$

where N represents the number of intervals among image-capture times of images and is represented by "(the number of images included in a node)−1", $td_n$, represents, among N intervals, the n-th interval from a temporally earlier interval, and "td" bearing "−" represents the mean of intervals in the node.

In addition, deviation dev (the absolute value of a difference between the mean of intervals among child nodes and the mean of intervals among image-capture times) of intervals among child nodes which have a node of interest as a parent node is calculated by $$\mathrm{dev} = |td_c - \overline{td}| \quad (2)$$

where N represents the number of intervals among the image-capture times of images and is represented by "(the number of images included in a node)−1", $td_c$ represents an interval between child nodes, and "td" bearing "−" represents the mean of intervals in the node.

The interval between child nodes is an interval between the image-capture time of a temporally last image included in a temporally earlier child node between two child nodes having a node of interest as a parent node, and the image-capture time of a temporally first image included in a temporally later child node. A specific example is described later.

The ratio of deviation dev calculated by expression (2) to standard deviation sd calculated by expression (1) is set as division parameter th in the node of interest. Division parameter th is represented by expression (3) and is used as a criterion for determining whether or not each child node having the node of interest as a parent node is to be divided as it belongs to a different cluster.

$$th = \frac{dev}{sd} \quad (3)$$

The value of division parameter th is specifically described with reference to FIG. 17.

Figure 17:
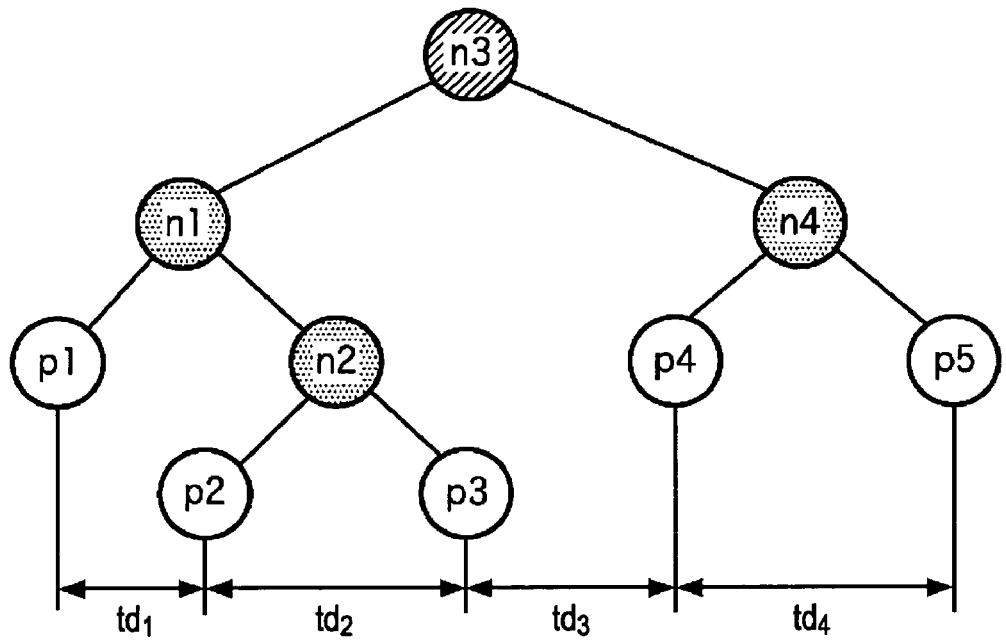
FIG. 17 is an illustration of clustering based on grouping conditions.

FIG. 17 shows part of the entirety of the binary tree structure created by the clustering section 51, the part being identical in range to FIG. 15.

In FIG. 17, $td_1$ represents an interval between the image-capture times of images p1 and p2, and $td_2$ represents an interval between the image-capture times of images p2 and p2. $td_3$ represents an interval between the image-capture times of images p3 and p4, and $td_4$ represents an interval between the image-capture times of images P4 and p5.

For example, node n3, which is closest to the root node in FIG. 17, is noted, at first, values are assigned to variables of expression (1), and standard deviation sd is represented by the following expression (4). Also, the mean of intervals among the image-capture times is represented by expression (5).

$$sd = \sqrt{\frac{(td_1 - \overline{td})^2 + (td_2 - \overline{td})^2 + (td_3 - \overline{td})^2 + (td_4 - \overline{td})^2}{4}} \quad (4)$$

$$\overline{td} = \frac{td_1 + td_2 + td_3 + td_4}{4} \quad (5)$$

Deviation dev is represented by $$\mathrm{dev} = |td_3 - \overline{td}| \quad (6)$$

In other words, two nodes having node n3 of interest as a parent node are nodes n1 and n4. interval $td_3$ between the image-capture time of temporally last image p3 included in temporally earlier node n1 and the image-capture time of temporally first image p4 included in temporally later node n4 is an interval between nodes n1 and n4. Interval $td_3$ is used for calculating deviation dev when node n3 is noted.

From standard deviation sd calculated by expression (4) and deviation dev calculated by expression (6), division parameter th obtained when node n3 is noted is calculated and is set in node n3.

When setting of division parameters in all the nodes finishes, the hierarchical determination section 52 subsequently sets threshold values as grouping conditions.

Figure 18:
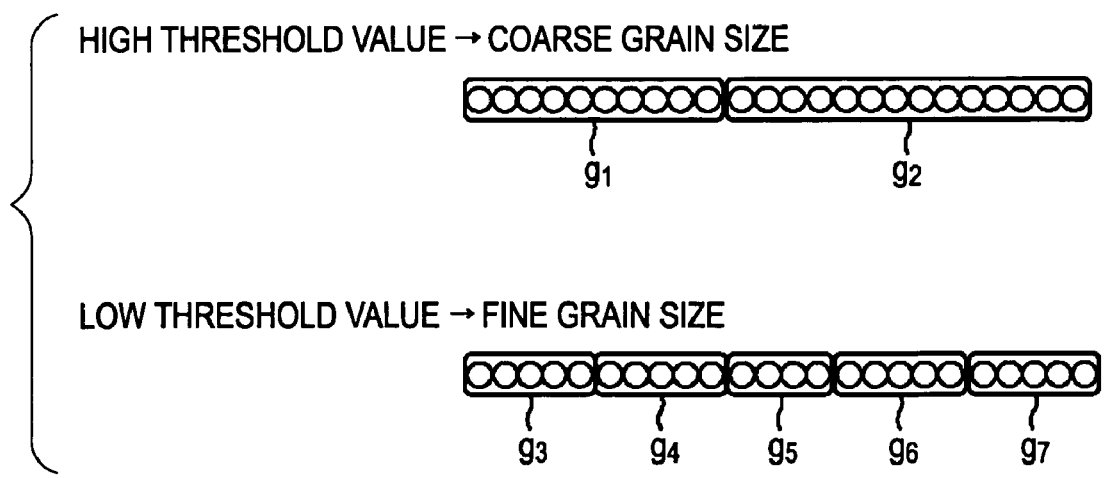
FIG. 18 is an illustration of examples of cluster finenesses.

When threshold value "a" is set as grouping condition A and threshold value b is set as grouping condition B, if the condition "a>b" is satisfied such as a case in which "a=3.0" and "b=2.6", as shown in FIG. 18, the state "(clusters prescribed by grouping condition A)>(clusters prescribed by grouping condition B)". In other words, in the clusters prescribed by grouping condition A, some clusters prescribed by grouping condition B are created.

In the case shown in FIG. 18, all the images to be subject to grouping are divided by grouping condition A into two clusters, that is, groups $g_1$ and $g_2$, and the images are divided by grouping condition B into five clusters, that is, groups $g_3$ to $g_7$.

In other words, as described later, when a set value of a division parameter is greater than the threshold value, a node in which the division parameter is set serves as a boundary between clusters. As the threshold value is greater, the node in which the division parameter is set is less likely to serve as the cluster boundary. Thus, the cluster fineness is coarse in an entire view. Conversely, as the threshold value is less, the node in which the division parameter is set is more likely to serve as the cluster boundary. Thus, the cluster fineness is fine in the entire view.

In a case in which an interval between the image-capture time of an image and the image-capture time of the next captured image is not less than 30 minutes ((interval td)>(30 minutes)) or is not less than one day ((interval td)>(1 day)), grouping conditions in which a portion having the interval serves as a cluster boundary, that is, grouping conditions that prescribe an upper limit of an interval among the image-capture times of images included in one cluster, may be set. Therefore, images in which an interval among the image-capture times of the images is not less than 30 minutes or not less than one day are handled as images included in different clusters.

After threshold values as grouping conditions are set, on the basis of the set threshold values and division parameters th set in nodes, as described above, the hierarchical determination section 52 sets division flags in the nodes.

For example, in a node in which division parameter th is greater than threshold value "a" set as grouping condition A, a group-A division flag, which has a value of one, is set, and, in a node in which division parameter th is not greater than threshold value "a", the group-A division flag, which has a value of zero, is set.

A state in which a value of one is set as the division flag indicates that an interval, among child nodes in which the node in which the division flag is set is used as a parent node, is relatively greater than an interval among the image-capture times of all images in a node of interest. Conversely, a state in which a value of zero is set as the division flag indicates that the interval, among child nodes in which the node in which the division flag is set is used as a parent node, is not so different from the interval among the image-capture times of all images in a node of interest.

When setting of the value of the group-A division flag finishes, nodes in the binary tree structure are noted in ascending order (in order in a direction from leaves to a root). A node in which an interval among child nodes is relatively greater than an interval among the image-capture times of all the image in the nodes, that is, a node in which a value of one is set as a group-A division flag, is used as a boundary to separate the images, and grouping condition A is used to prescribe clusters.

Figure 19:
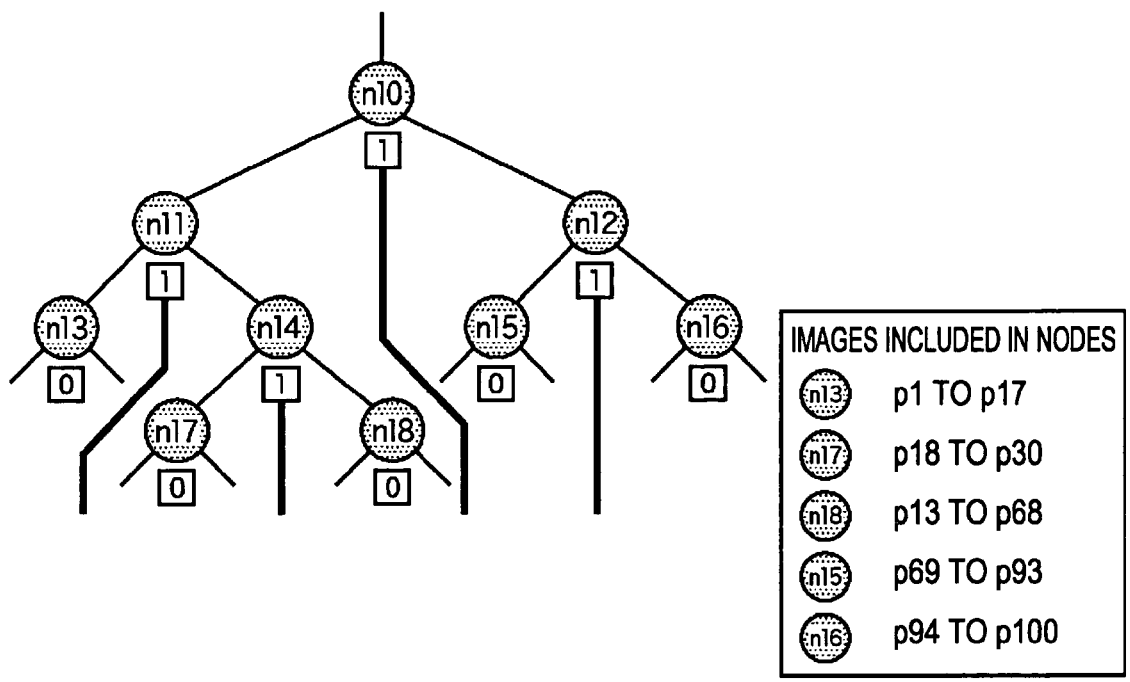
FIG. 19 is an illustration of an example of setting of a group-A division flag.

FIG. 19 shows an example of setting of the group-A division flag.

In the example shown in FIG. 19, nodes n11 and n12 are respectively connected as left and right nodes to node n10, which is closest to the root node. Nodes n13 and n14 are respectively connected as left and right nodes to node n11. Nodes n15 and n16 are respectively connected as left and right nodes to node n12, and nodes n17 and n18 are connected as left and right nodes to node n14.

Also, in the example in FIG. 19, a value of one is set as the group-A division flag to each of nodes n10, n11, n12, and n14 among the above nodes. The nodes in each of which one is set as the group-A division flag are used as boundaries to separate clusters, as indicated by the bold lines in FIG. 19.

As shown on the right side in FIG. 19, node n13 includes images p1 to p17, and node n17 includes images p18 to p30. Node n18 includes images p31 to p68, and node n15 includes images p69 to p93. Node n16 includes images p94 to p100.

Figure 20:
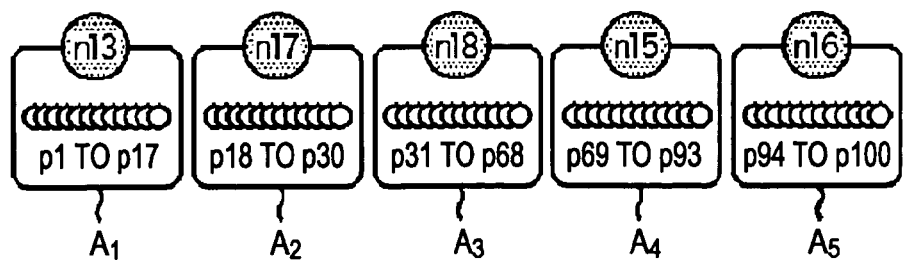
FIG. 20 is an illustration of an example of the result of clustering based on grouping condition A.

Therefore, when the nodes in each of which one is set as the group-A division flag are used as boundaries to separate clusters, images p1 to p100, which are to be subject to clustering, are divided into corresponding clusters (event cluster A) as shown in FIG. 20.

In other words, images p1 to p17 included in node n13 form cluster $A_1$, and images p18 to p30 included in node n17 form cluster $A_2$.

Images p31 to p68 included in node n18 form cluster $A_3$, and images p69 to p93 included in node n15 form cluster $A_4$. Images P94 to p100 included in node n16 form cluster $A_5$.

As described above, clustering based on grouping condition A is performed, whereby information that indicates which range of images each cluster prescribed by grouping condition A includes, or information that indicates which cluster each image belongs to, is acquired as the result of clustering based on grouping condition A.

When the clustering based on grouping condition A is performed, grouping based on grouping condition B is performed.

Specifically, in the hierarchical determination section 52, a group-B division flag, which has a value of one, is set in each node in which division parameter th is greater than threshold value b set as grouping condition B, the group-B division flag, which has a value of zero, is set in each node in which division parameter th is not greater than threshold value b.

When setting of the value of the group-B division flag finishes, nodes in the binary tree structure are noted in ascending order. Each node in which an interval among child nodes is relatively greater than an interval among the image-capture times of all the images in the node, that is, each node in which a value of one is set as the group-B division flag, is used to divide images, and clusters are prescribed on the basis of grouping condition B.

Figure 21:
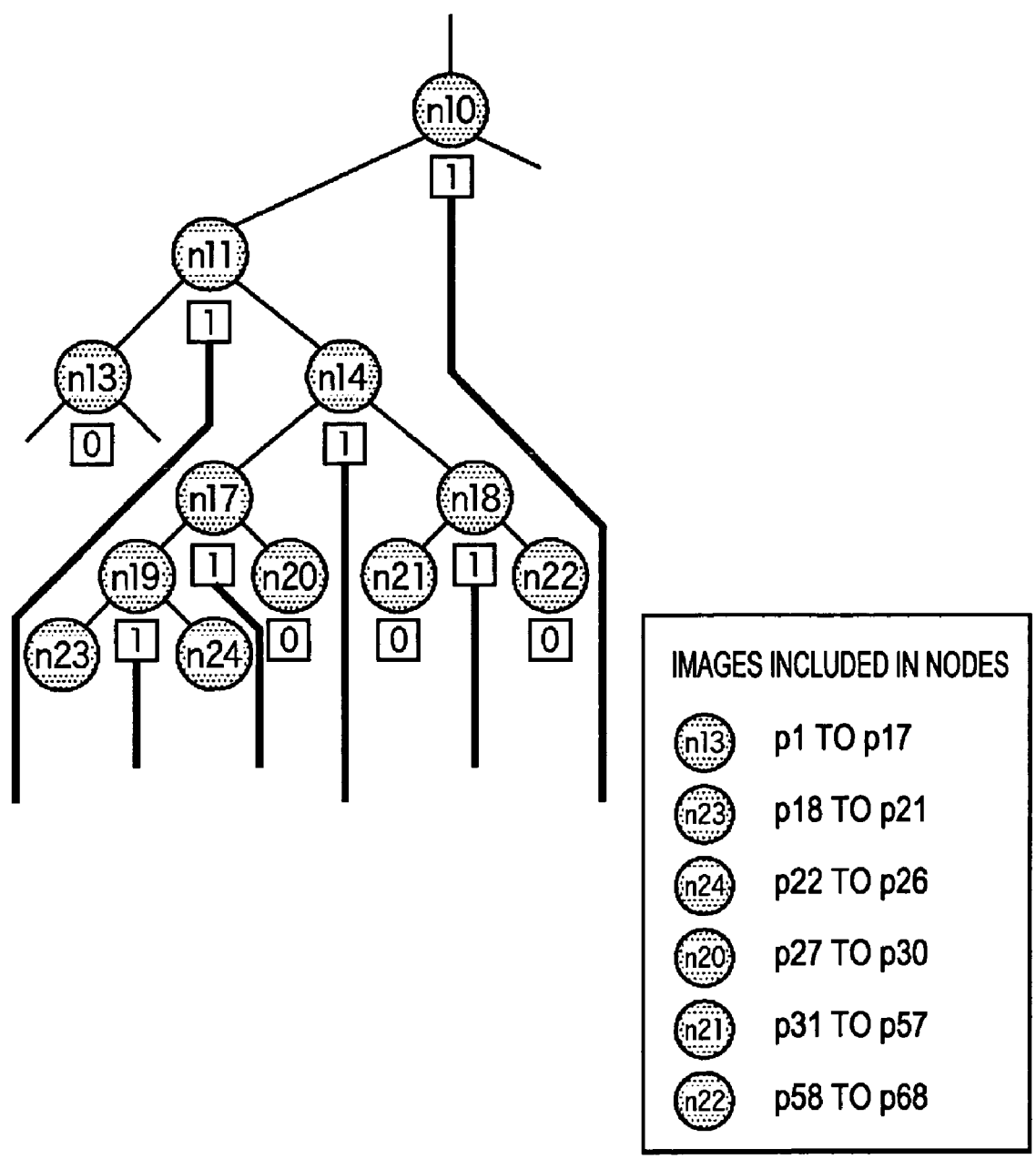
FIG. 21 is an illustration of an example of setting of a group-B division flag.

FIG. 21 shows an example of setting of the group-B division flag.

In the example shown in FIG. 21, node n11 is connected as a left node to node n10, which is closest to the root node, and nodes n13 and n14 are respectively connected as left and right nodes to node n11. Nodes n17 and n18 are respectively connected as left and right child nodes to node n14, and nodes n19 and n20 are respectively connected as left and right child nodes to node n17. Nodes n21 and n22 are respectively connected as left and right child nodes to node n18, and nodes n23 and n24 are respectively connected as left and right child nodes to node n19.

In the example in FIG. 21, a value of one as the group-B division flag is set in each of nodes n10, n11, 14, n17, n18, and n19 among the above nodes, and these nodes are used as boundaries to separate clusters as indicated by the bold lines shown in FIG. 21.

As shown on the right side of FIG. 21, node n13 includes images p1 to p17, and node n23 includes images p18 to p21.

Node n24 includes images p22 to p26, and node n20 includes images p27 to p30. Node n21 includes images p31 to p57, and node n22 includes images p58 to p68.

Figure 22:
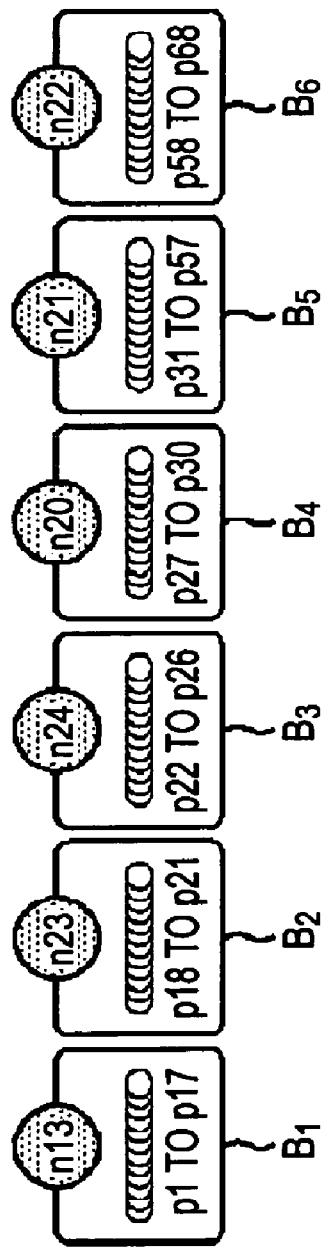
FIG. 22 is an illustration of an example of the result of clustering based on grouping condition B.

Accordingly, when the nodes in each of which one is set as the value of the group-B division flag are used as boundaries to separate clusters, images p1 to p68 to be subject to clustering among images p1 to p100 are divided into corresponding clusters (sub-event cluster B) as shown in FIG. 22.

In other words, images p1 to p17 included in node n13 form cluster $B_1$, and images p18 to p21 included in node n23 form cluster $B_2$.

Images p22 to p26 included in node n24 form cluster $B_3$, and images p27 to p30 included in node n20 form cluster $B_4$. Images p31 to p57 included in node n21 form cluster $B_5$, and images p58 to p68 included in node n22 form cluster $B_6$.

As described above, clustering based on grouping condition B is performed, whereby information that indicates which range of images each cluster prescribed by grouping condition B includes, or information that indicates which cluster each image belongs to, is acquired as the result of clustering based on grouping condition B. The acquired result of clustering is output and recorded in the cluster database 37.

Figure 23:
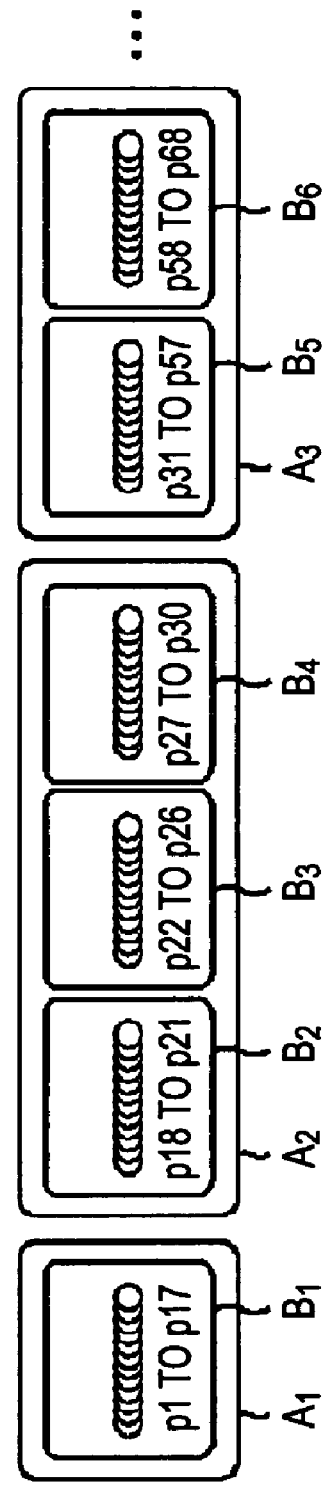
FIG. 23 is an illustration of nest relations of clusters.

FIG. 23 shows the result of clustering (FIG. 20) based on grouping condition A and the result of clustering (FIG. 22) based on grouping condition B in a superimposing manner.

As shown in FIG. 23, when grouping is performed on the basis of a plurality of grouping conditions, clusters obtained by clustering have nest relations.

In the example shown in FIG. 23, clusters $A_1$ and $B_1$ include images in the same range, and cluster $A_2$ includes clusters $B_2$ to $B_4$. Cluster $A_3$ includes clusters $B_5$ and $B_6$.

When the respective clusters have the relations shown in FIG. 23, folders representing clusters $B_2$ to $B_4$ are displayed as folders that are lower in layer than a folder representing cluster $A_2$, and folders representing clusters $B_5$ to $B_6$ are displayed as folders that are lower in layer than a folder representing cluster $A_3$.

As described above, the arithmetic unit 35 performs hierarchical clustering, and clustering (clustering in which the mean of image capturing intervals among all the images is used as a reference) based on distribution. Therefore, instead of performing clustering so that images having simply close image capturing intervals are included in the same cluster, clustering is performed so that images having similar intervals are included in the same cluster.

Accordingly, compared with the case of performing clustering so that images having close image capturing intervals are included in the same cluster, clustering can be performed so as to match a user's subjective intention.

In order to find event units desired by the user and to create clusters in the event units, instead of noting an image capturing interval itself, an image capturing frequency needs to be noted, and, by using, as a cluster boundary, a portion in which the frequency changes, the obtained clusters come to nearly have the event units. To know the image capturing frequency, it is necessary to statistically analyze all images (to be subject to clustering) that have been captured. As techniques therefor, the hierarchical clustering and the clustering based on distribution are employed.

In addition, the respective images are managed in a form in which they have a hierarchical structure. Thus, by changing a threshold value as a grouping condition, the user can easily perform cluster restructuring such as combining a plurality of clusters into one cluster, and dividing one cluster into a plurality of clusters. As described above, by raising the threshold value, the cluster fineness can be made coarse, that is, a plurality of clusters can be combined into one cluster. Conversely, by lowering the threshold value, the cluster fineness can be made fine, that is, one cluster can be divided into a plurality of clusters.

This makes it possible to perform, for example, when images are viewed in slide show playback, similarly to a chapter jump in video playback, jumping in units of events (event clusters), and jumping in units of sub-events (sub-event clusters) generated by dividing one event.

Furthermore, clustering is performed by using, as a reference, the mean of image capturing intervals among all the images, whereby a grouping condition can be set without considering a personal difference in image capturing style. In other words, a personal grouping condition does not need to be set, even if the user has an image capturing style of not so frequently performing image capturing or of frequently performing image capturing.

For example, when images that are captured within 30 minutes are handled as images belonging to the same cluster, if there is an interval of 30 minutes or longer from earlier image capturing of an image, the earlier captured image and a later captured image are handled as images belonging to different clusters. Accordingly, when the user has an image capturing style of not so frequently performing image capturing, that is, when the user has an image capturing style of performing image capturing at an interval of 30 minutes or longer, images that are captured in a trip are handled as images respectively belonging to different clusters.

In addition, when the interval used as a reference for clustering is set to be longer so that images captured during a day are handled as images belonging to the same cluster, despite image capturing performed during completely different events in the morning and the afternoon, all the captured images are handled as images belonging to the same cluster. Clustering is performed by using, as a reference, the mean of image capturing intervals among all the images, whereby clustering that matches a user's personal image capturing style can be performed. Accordingly, the above inconvenience can be avoided.

Next, processing of the digital camera 1 having the above-described features is described below.

Figure 24:
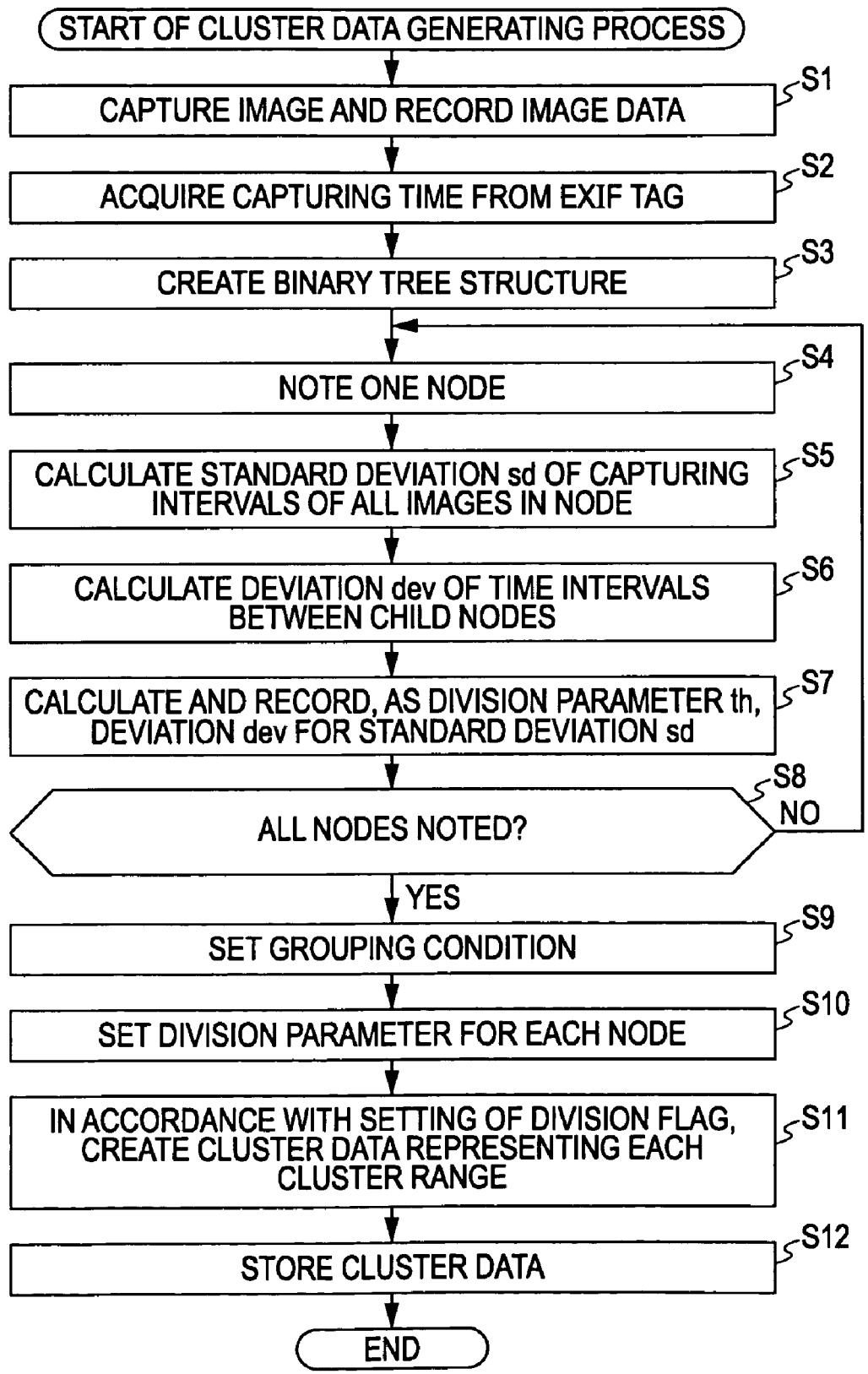
FIG. 24 is a flowchart illustrating a cluster data generating process of the digital camera.
Figure 25:
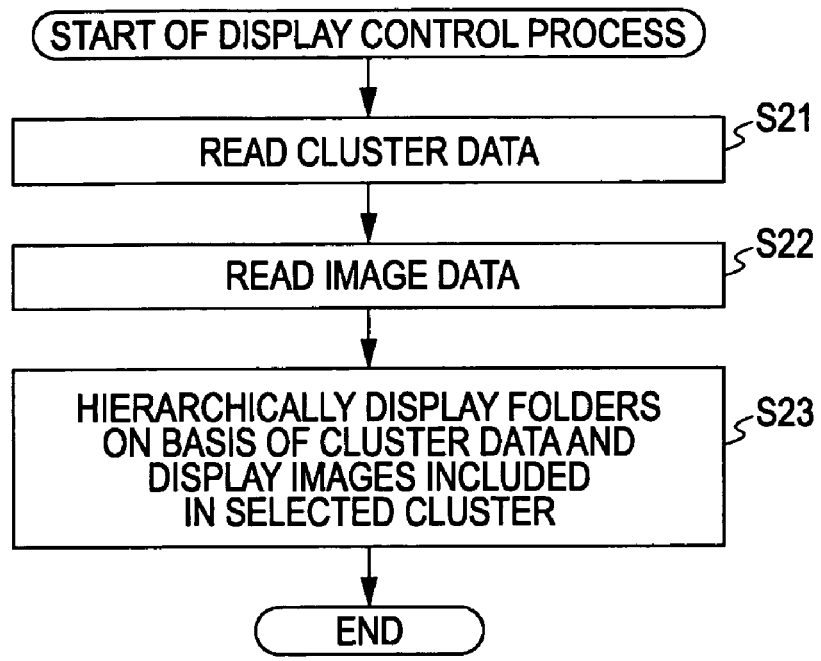
FIG. 25 is a flowchart illustrating a display control process for controlling a browsing screen of the digital camera.

At first, a cluster data generating process of the digital camera 1 is described below with reference to the flowchart shown in FIG. 24.

When the shutter button 12 provided on the top surface of the housing is pressed by the user, in step S1, the capturing unit 32 captures an image of the subject by performing analog-to-digital conversion on an image signal supplied from the image capturing element included in the camera unit 31, and records image data obtained by the image capturing in the image database 33 so as to be associated with an EXIF tag.

In step S2, the tag reading unit 34 acquires an image-capture time from the EXIF tag of the captured image, and outputs the acquired image-capture time to the arithmetic unit 35. In other words, this case shows that clustering is performed whenever one image is captured.

In step S3, on the basis of the image-capture time supplied from the tag reading unit 34 and the cluster data recorded in the cluster database 37, the clustering section 51 in the arithmetic unit 35 creates a binary tree structure including all images which are to be subject to clustering, as described with reference to FIGS. 8 to 16.

In step S4, the hierarchical determination section 52 notes one node in a predetermined layer in the binary tree structure. Proceeding to step S5, the hierarchical determination section 52 calculates standard deviation sd of intervals among the image-capture times of all the images included in the node of interest.

In step S6, the hierarchical determination section 52 calculates deviation dev of intervals among child nodes having the node of interest as a parent node.

In step S7, the hierarchical determination section 52 calculates the ratio of deviation dev calculated in step S6 to standard deviation sd calculated in step S5, and records the calculated ratio as division parameter th in the node of interest.

In step S8, the hierarchical determination section 52 determines whether all the nodes in the binary tree structure have been noted. If it is determined that all the nodes in the binary tree structure have not been noted, the process returns to step S4, switches the node of interest to another, and repeatedly performs the subsequent steps.

If, in step S8, it is determined that all the nodes in the binary tree structure have been noted, the hierarchical determination section 52 proceeds to step S9 and sets a threshold value as a grouping condition. When clusters having different finenesses are found for the same image, the hierarchical determination section 52 sets a plurality of grouping conditions.

In step S10, the hierarchical determination section 52 compares the threshold value set as the grouping condition in step S9 and the division parameter set in each node. For example, a division flag, which has a value of one is set in each node in which division parameter th is greater than the threshold value. The division flag, which has a value of zero, is set in each node in which division parameter th is not greater than the threshold value. When a plurality of grouping conditions are set, division parameters are set for the grouping conditions.

In step S11, the hierarchical determination section 52 notes the nodes in the binary tree structure, separates clusters by using the nodes in which ones are set in the division flags, and generates cluster data representing the range of each cluster.

In step S12, the hierarchical determination section 52 stores the generated cluster data in the cluster database 37, and the process finishes.

Next, a process of the digital camera 1 for displaying the browsing screen is described below.

In step S21, the browsing view display unit 39 reads the cluster data from the cluster database 37. Proceeding to step S22, the browsing view display unit 39 reads, from the image database 33 image data included in a cluster prescribed by the read cluster data.

In step S23, the browsing view display unit 39 displays the hierarchical structure of each cluster on the basis of the cluster data read from the cluster database 37, and displays, in a list form, images included in a predetermined folder on the data read from the image database 33.

This allows the display 14 to display the browsing screen as shown in FIG. 6. Accordingly, the user confirms images in units of clusters by selecting the predetermined folder.

Although, in the foregoing, the above-described clustering is performed in the digital camera 1, the clustering can be performed in each of various devices other than the digital camera 1. For example, the clustering can be performed in devices, having image browsing functions, such as a photo viewer, a portable terminal, a cellular phone, a game machine, a personal computer, a portable audio player, and a photograph/video storage-and-playback devices.

Figure 26:
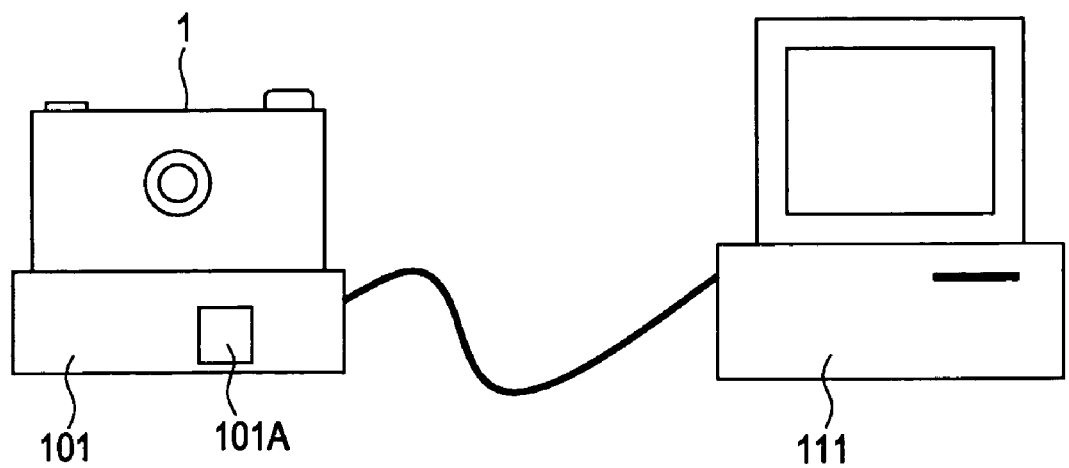
FIG. 26 is an illustration of a state in which a personal computer and the digital camera are connected to each other.

FIG. 26 shows a state in which the digital camera 1 is connected to a personal computer 111.

In the state shown in FIG. 26, the digital camera 1 is installed in a cradle 101, and the cradle 101 is connected to the personal computer 111 via a cable. The digital camera 1 and the personal computer 111 can communicate with each other by using the cradle 101 and the cable. The digital camera 1 and the lens unit 11 may be directly connected to each other by using the cable or wirelessly without being connected via the cradle 101.

By pressing a synchronization button 101A provided on the cradle 101, the image data recorded in the digital camera 1 is loaded into the personal computer 111. Then, EXIF tags associated with the image data are also loaded into the personal computer 111.

After loading the image data and the EXIF tags, the personal computer 111 performs the above-described clustering on the basis of image-capture times included in the EXIF tags of the images. The result of the clustering, cluster data, is transferred to the digital camera 1, or is used for the personal computer 111 to display the browsing screen shown in FIG. 6.

In other words, in the personal computer 111, among the functional units shown in FIG. 7, at least the tag reading unit 34, arithmetic unit 35 (the clustering section 51, the hierarchical determination section 52), condition setting unit 36, and cluster database 37 are realized.

After receiving cluster data transferred from the personal computer 111, the digital camera 1 displays the browsing screen shown in FIG. 6 on the basis of the cluster data, which is created by the lens unit 11. This enables the digital camera 1 to display the browsing screen, even if the digital camera 1 does not have any function for performing clustering.

Figure 27:
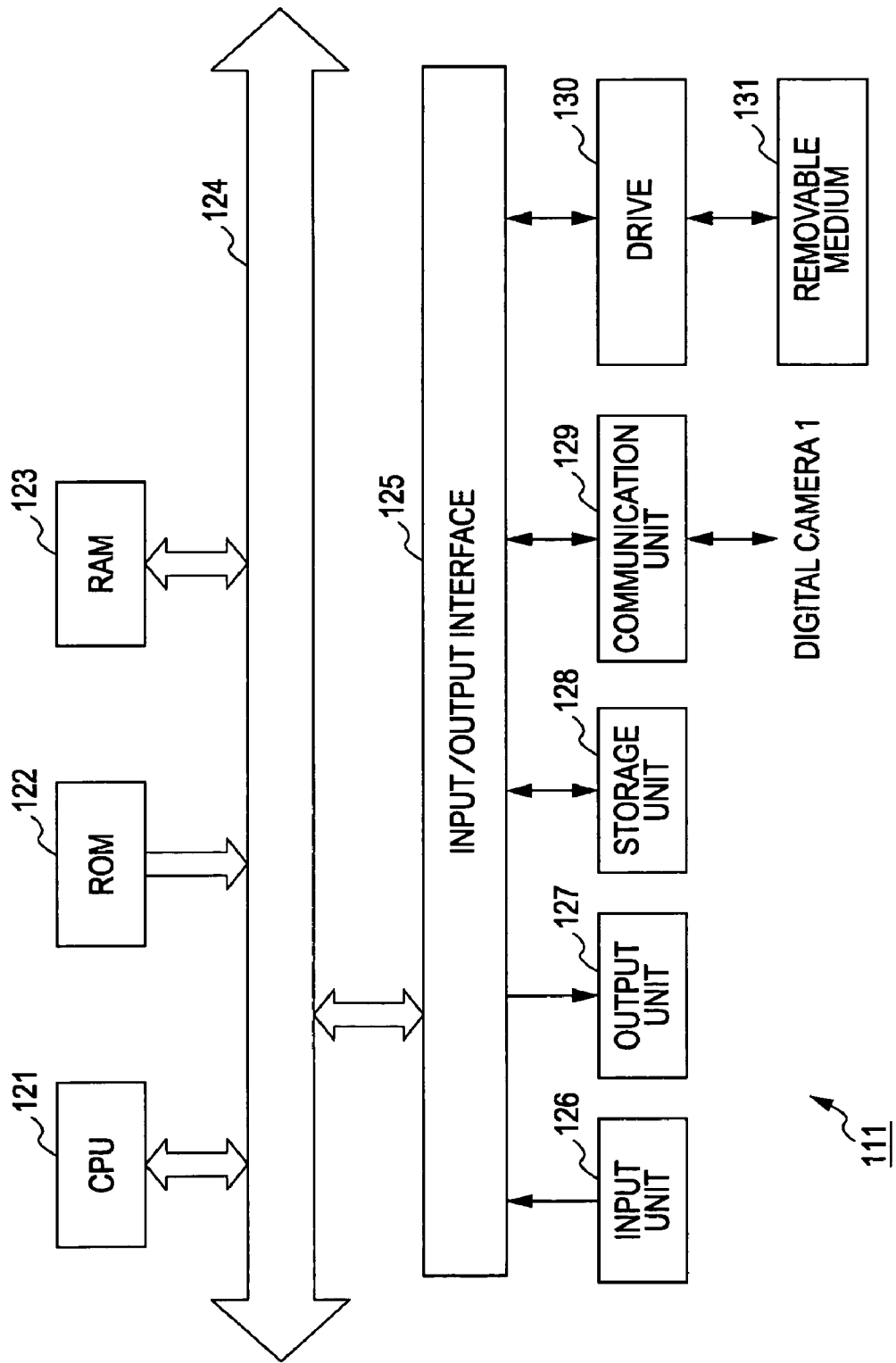
FIG. 27 is a block diagram showing an example of the configuration of the personal computer.

FIG. 27 is a block diagram showing an example of the configuration of the personal computer 111 shown in FIG. 26.

A CPU (central processing unit) 121 executes various types of processing in accordance with programs recorded in a ROM (read-only memory) 122 or a storage unit 128. A RAM (random access memory) 123 stores a program, data, etc., which are executed by the CPU 121, if necessary. The CPU 121, the ROM 122, and the RAM 123 are connected to one another by a bus 124.

As the CPU 121, the Cell, described in "Cell *Tanjo* (Birth of Cell)", *Nikkei Erekutoronikusu* (Japanese electronics magazine), Nikkei Business Publications, Inc., Feb. 28, 2005, pages 89-117, can be employed.

The CPU 121 connects to an input/output interface 125 via the bus 124. The input/output interface 125 connects to an input unit 125 including a keyboard, a mouse, and a microphone, and an output unit 127 including a display and a speaker. The CPU 121 executes various type of processing in response to commands input from the input unit 126, and outputs the result of processing to the output unit 127.

The storage unit 128 connected to the input/output interface 125 includes a hard disk, and stores programs to be executed by the CPU 121 and various types of data. A communication unit 129 communicates with the digital camera 1, and outputs the image data and EXIF tags loaded from the digital camera 1 to the CPU 121. The communication unit 129 performs communication with an external device via a network such as the Internet or a local area network.

When a removable medium 131, such as a magnetic disk, an optical disc, a magneto-optical disc, or a semiconductor memory, is loaded, a drive 130 connected to the input/output interface 125 drives the removable medium 131, and acquires a program or data recorded in the removable medium 131. The acquired program or data is transferred and stored in the storage unit 128, if necessary.

Figure 28:
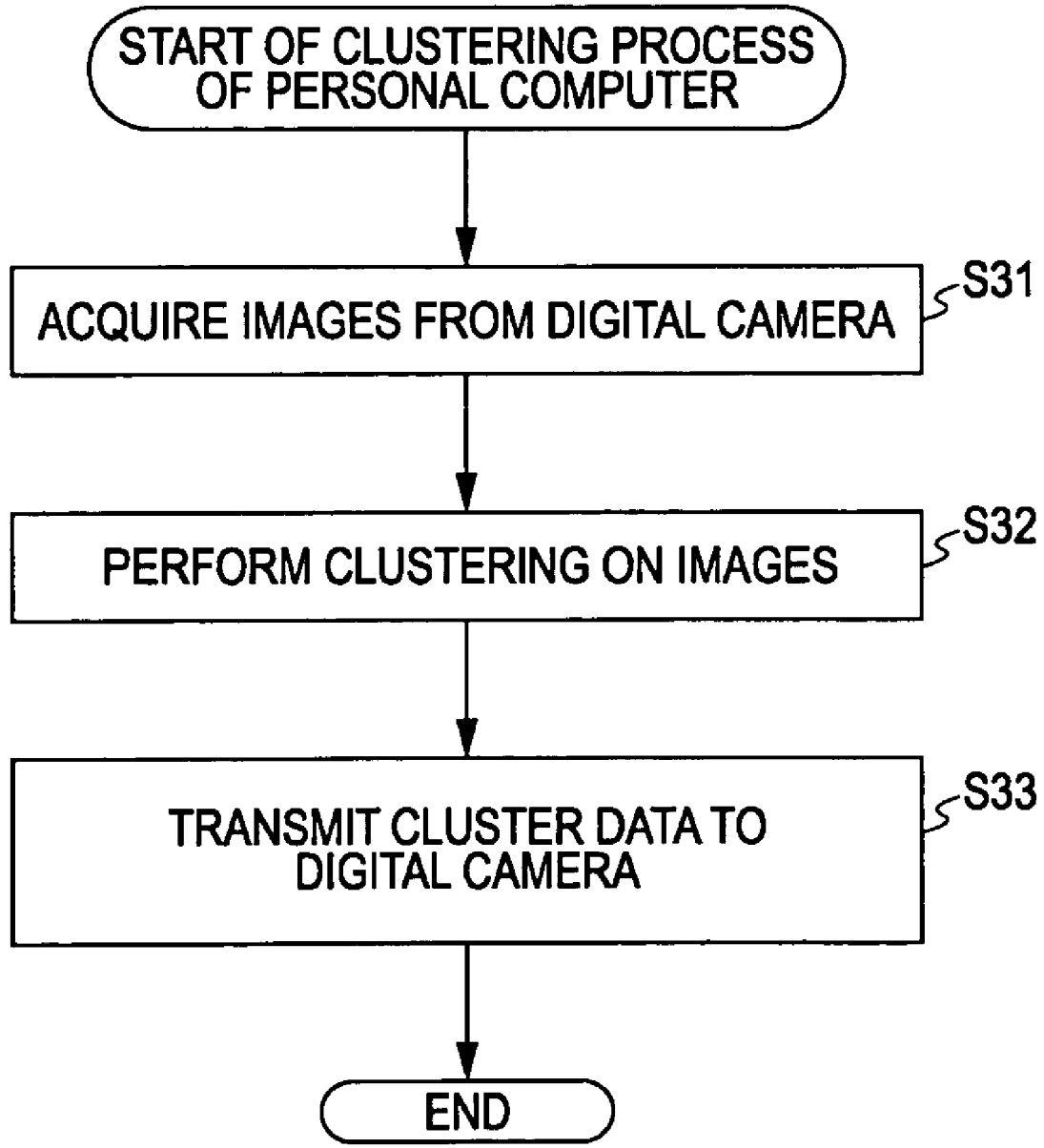
FIG. 28 is a flowchart illustrating a clustering process of the personal computer.

Next, a process of the personal computer 111 for performing clustering based on the data loaded from the digital camera 1 is described below whether the flowchart shown in FIG. 28.

This process is performed by an application that is activated when the synchronization button 101A of the cradle 101 in which the digital camera 1 is installed is pressed, or by an application that is directly activated in the personal computer 111 by a user's operation. This application realizes, for example, part of the functional units shown in FIG. 7.

In step S31, the CPU 121 controls the communication unit 129 to acquire image data and EXIF tags from the digital camera 1.

In step S32, the CPU 121 (the tag reading unit 34, arithmetic unit 35, and condition setting unit 36 realized by the CPU 121) performs image clustering. In step S32, the CPU 121 performs the process as described with reference to FIG. 24 to acquire cluster data.

In step S33, the CPU 121 controls the communication unit 129 to transmit the acquired cluster data to the digital camera 1 before finishing this process.

As described above, the above-described clustering may be performed in each of various types of devices other than the digital camera 1.

When cluster data is written in an extension of each EXIF tag that is attribute information of the image data, cluster data, which is acquired by the personal computer 111, may be transferred to the digital camera 1 in a form written in each EXIF tag of the image data together with the image data.

In addition, this clustering may be executed by a server connected via a network and the server may provide a clustering service on the Web.

Figure 29:
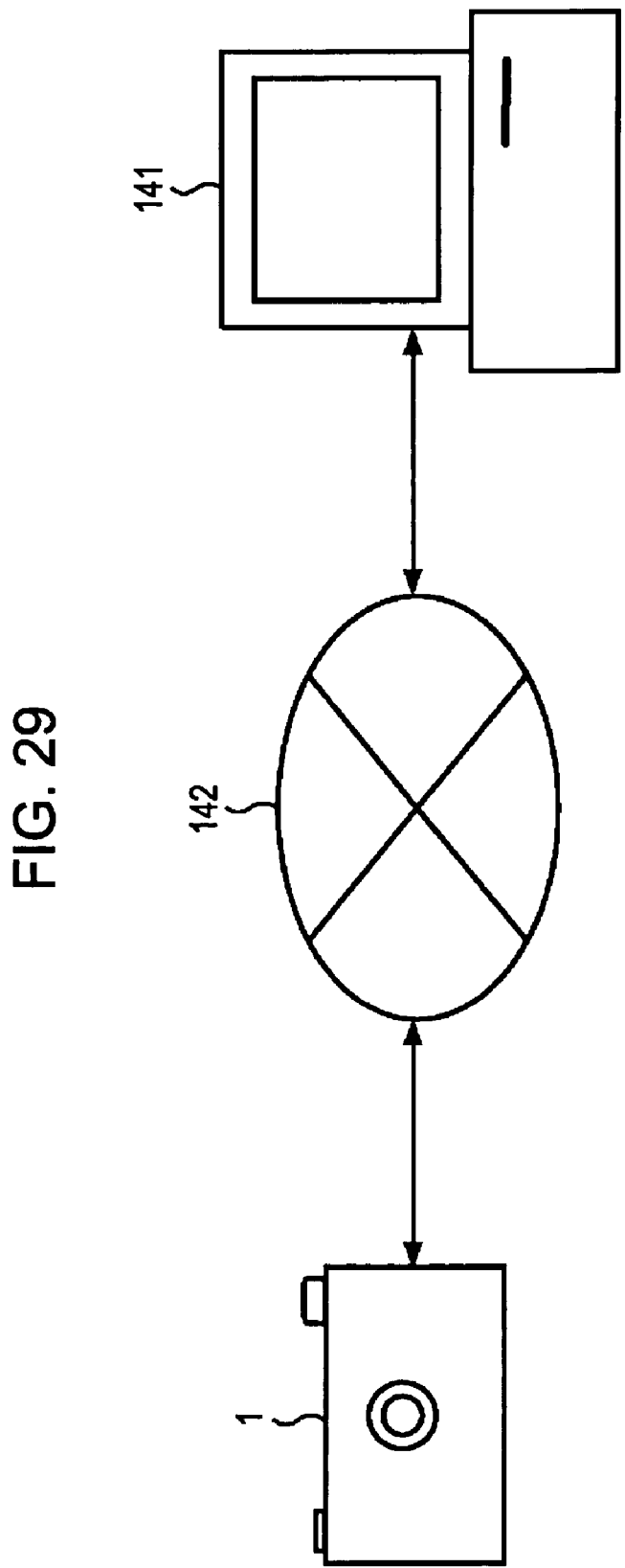
FIG. 29 is an illustration of a configuration for realizing a clustering service.

FIG. 29 shows an example configuration for realizing the clustering service.

In FIG. 29, the digital camera 1 and a server 141 are connected to each other by a network 142 such as the Internet, thus enabling communication between the digital camera 1 and the server 14.

For example, when the user of the digital camera 1 performs a predetermined operation, each EXIF tag associated with image data recorded in the digital camera 1 is transmitted to the server 141 through the network 142. Not only the EXIF tag but also the image data itself may be transmitted from the digital camera 1 to the server 141.

After receiving the EXIF tag transmitted from the digital camera 1, the server 141 performs the above-described clustering on the basis of image-capture times included in the EXIF tags. Cluster data that is the result of the clustering is transmitted to the digital camera 1 through the network 142 and is used in the digital camera 1 to display the browsing screen as shown in FIG. 6.

Such a clustering service that, after clustering is performed by the server 141 connected via the network 142, the result of the clustering is sent back from the server 141 to a device that transmits EXIF tags and image data may be realized.

Next, a different example of creation of the binary tree structure performed by the clustering section 51 is described below with reference to FIGS. 30 to 37.

Here, a case in which images are to be subject to clustering without using order of image-capture times is described. For example, in a case in which, after clustering of images captured by the digital camera 1 is performed by the personal computer 111 shown in FIG. 26, also images captured by a different digital camera, such as images given from a person different from the user, are loaded into the personal computer 111, and clustering is performed on all the images, clustering on the images is performed without performing clustering in order of image-capture times.

Figure 30:
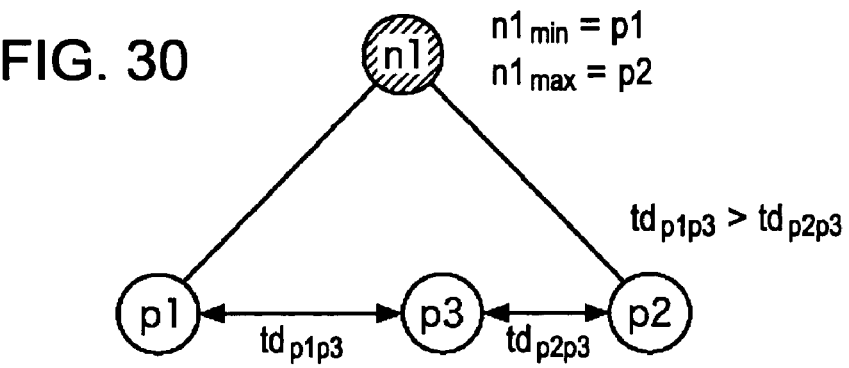
FIG. 30 is an illustration of creation of a binary tree structure.
Figure 31:
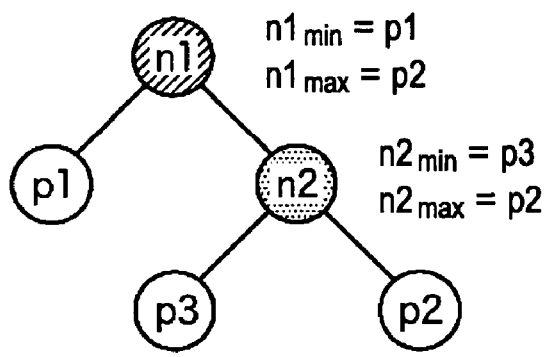
FIG. 31 is an illustration, of creation of the binary tree structure, following FIG. 30.

For example, in a case in which, as shown in FIG. 9, with image p1 connected as a left child node to node n1, and image p2 connected as a right child node to node n1, image p3 that is newer than image p1 and older than image p2 is inserted into the tree, when, as shown in FIG. 30, interval $td_{p1p3}$ between the image-capture times of images p1 and p3 is greater than interval $td_{p2p3}$ between the image-capture times of images p2 and p3, as shown in FIG. 31, new node n2 is created. Image p3 is connected as a left child node to node n2 and image p2 is connected as a right child node to node n2. Also, instead of image p2, node n2 is connected as a right child node to node n1.

The image-capture time of image p3 is recorded as the minimum time of node n2, and the image-capture time of image p2 is recorded as the maximum time of node n2. At this time, there are no changes in the minimum and maximum times of node n1 that is a parent node for node n2 (the image-capture time of image p1 remains as the minimum time, and the image-capture time of image p2 remains as the maximum time).

Figure 32:
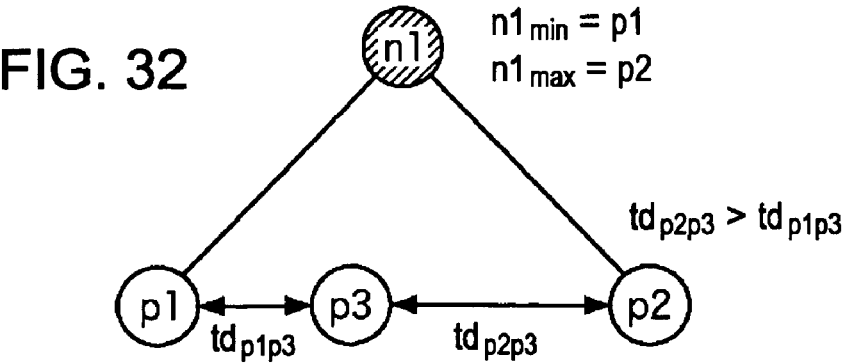
FIG. 32 is an illustration, of creation of the binary tree structure, following FIG. 31.
Figure 33:
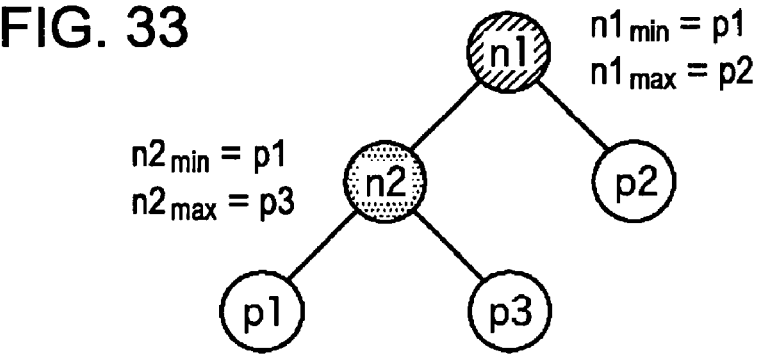
FIG. 33 is an illustration, of creation of the binary tree structure, following FIG. 32.

In addition, in a case in which, as shown in FIG. 9, with image p1 connected as the left child node to node n1, and image p2 connected as the right child node to node n1, when image p3 that is newer than image p1 and older than image p2 is inserted into the tree, and, as shown in FIG. 32, interval $td_{p1p3}$ between the image-capture times of images p1 and p3 is less than interval $td_{p2p3}$ between the image-capture times of images p2 and p3, new node n2 is created, as shown in FIG. 33. Image p2 is connected as a left child node to node n2, and image p3 is connected as a right child node to node n2. Also, instead of image p1, node n2 is connected as a left child node to node n1.

The image-capture time of image p1 is recorded as the minimum time of node n2, and the image-capture time of image p3 is recorded as the maximum time of image p3. At this time, there are no changes in the minimum and maximum times of node n1 that is the parent node for node n2 (the image-capture time of image p1 remains as the minimum time, and the image-capture time of image p2 remains as the maximum time).

Figure 34:
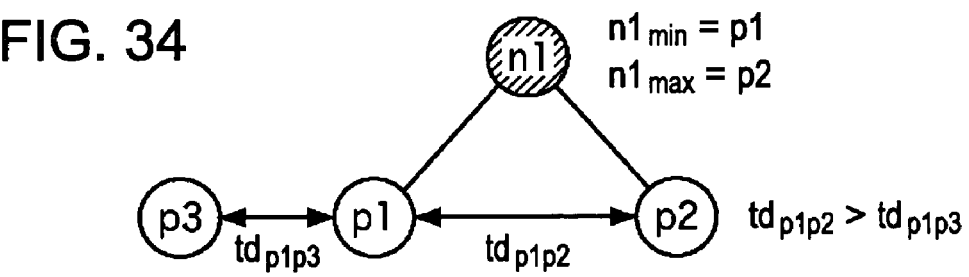
FIG. 34 is an illustration, of creation of the binary tree structure, following FIG. 33.
Figure 35:
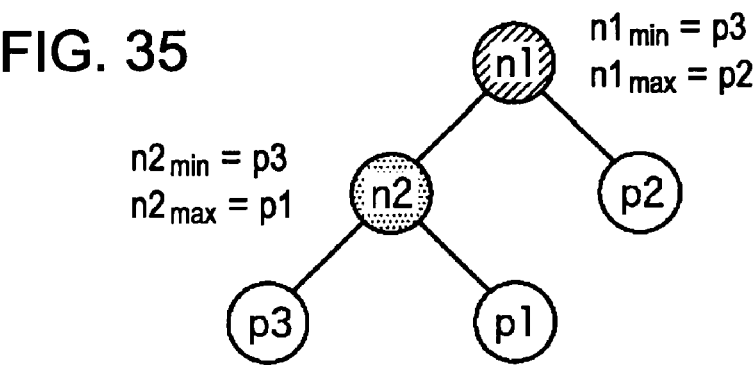
FIG. 35 is an illustration, of creation of the binary tree structure, following FIG. 34.

In addition, in a case in which, as shown in FIG. 9, with image p2 connected as a left child node to node n1, and image p2 connected as a right child node to node n1, image p3 that is older than image p1 is inserted into the tree, when, as shown in FIG. 34, interval $td_{p1p3}$ between the image-capture times of images p1 and p3 is less than interval $td_{p1p2}$ between the image-capture times of images p1 and p2, new node n2 is created, as shown in FIG. 35. Image p3 is connected as a left child node to node n2, and image p2 is connected as a right child node to node n2. Also, instead of image p1, node n2 is connected as a left child node to node n1.

The image-capture time of image p3 is recorded as the minimum time of node n2, and the image-capture time of image p1 is recorded as the maximum time of node n2. Then, the minimum time of node n1 that is the parent node for node n2 is overwritten by the image-capture time of image p3. There is no change in the maximum time of node n1 (the image-capture time of image p2 remains as the maximum time).

Figure 36:
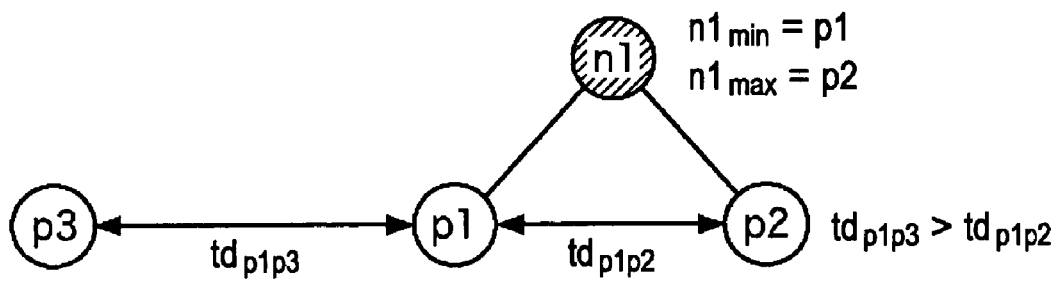
FIG. 36 is an illustration, of creation of the binary tree structure, following FIG. 35.
Figure 37:
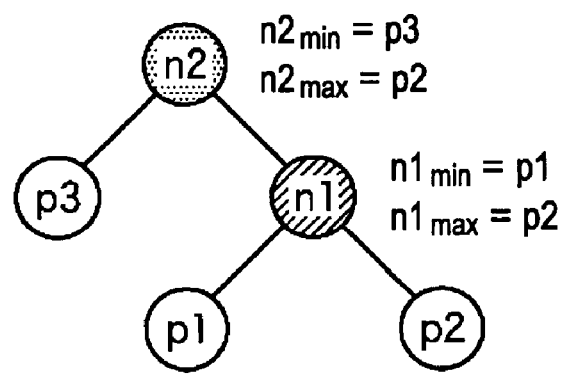
FIG. 37 is an illustration, of creation of the binary tree structure, following FIG. 36.

In addition, in a case in which, as shown in FIG. 9, with image p1 connected as the left child node to node n1, and image p2 connected as the right child node to node n1, when image p3 that is older than image p1 is additionally inserted into the tree, and, as shown in FIG. 36, interval $td_{p1p3}$ between the image-capture times of images p1 and p3 is greater than interval between the image-capture times of images p1 and p2, node n2 is created as a root node, as shown in FIG. 37. Also, image p3 is connected as a left child node to node n2, node n1 is connected as a right child node to node n2.

The image-capture time of image p3 is recorded as the minimum of node n2, the image-capture time of image p2 is recorded as the maximum time of node n2. At this time, there are no changes in the minimum and maximum times of node n1 (the image-capture time of image p1 remains as the minimum time, and the image-capture time of image p2 remains as the maximum time).

Also, in a case in which image p4 or the subsequent image is additionally inserted, when the inserted image p4 is the newest image among images that have already been subject to clustering, the processing described with reference to FIGS. 8 to 16 is similarly performed. In other cases, the processing described with reference to FIGS. 30 to 37 is performed.

Although, in the foregoing, all the images recorded in the image database 33 are to be subject to clustering, for part of the images recorded in the image database 33, clustering may be performed.

In addition, although the foregoing describes a case in which images to be subject to clustering are still images, clustering on moving images may be performed. In this case, as time information for use in clustering, for example, capturing-start-time information that is added as attribute information to each set of moving images is used.

Furthermore, what is to be subject to clustering is not limited to still images and moving images. Instead, clustering on each of types of information having time information as attribute information may be performed. For example, files, such as a text file and an audio file, which are handled by the personal computer 111 have information of creation times and updating times of the files as attribute information added to the files. Thus, also by using the information of the times, the above-described clustering can be performed.

The above-described consecutive processing may be executed either by hardware or by software. When the above-described consecutive processing is executed by software, a program forming the software is installed from a program storage medium to a computer built into dedicated hardware or to, for example, a multi-purpose personal computer that can execute various functions by installing various programs.

Types of the program recording medium, which has a program recorded therein that is made executable by a computer after being installed into the computer include the removable medium 131 shown in FIG. 27, which is a package medium formed by one of a magnetic disk (including a flexible disk), an optical disc (CD-ROM (compact disc read-only memory) or DVD (digital versatile disc)), a magneto-optical disc, and a semiconductor memory, the ROM 122, in which a program is temporarily or eternally stored, and the storage unit 128, which includes a hard disk. Storing of the program to the program recording medium is performed by using a wired or wireless communication medium, such as a LAN, the Internet through the communication unit 129, which is an interface such as a router or a modem, if necessary.

In this specification, steps constituting a program recorded in the recording medium definitely include processing steps executed in a time-series manner in given order, and include processing steps which are executed in parallel or separately if they are not necessarily executed in a time-series manner.

It should be understood by those skilled in the art that various modifications, combinations, sub-combinations and alterations may occur depending on design requirements and other factors insofar as they are within the scope of the appended claims or the equivalents thereof.

Types of computer-readable storage mediums include agnetic disc (including a flexible disc), the optical disc (including a CD-ROM (Compact Disc-Read Only Memory), a DVD (Digital Versatile Disc)), an electro-optical disc or a semiconductor memory, the ROM (not shown) in which programs are stored temporarily or permanently, and hard disc forming the storage unit 308 and the hardware disclosed above.

What is claimed is:

1. An information processing apparatus comprising:
   a processor; a memory;
   an acquisition means for acquiring a plurality of pieces of information to be grouped, the pieces of information including time information as attribute information; and
   an arithmetic means for:
      grouping the pieces of information acquired by the acquisition means so that a portion in which a level of variation of intervals among times represented by the time information included in the pieces of information is greater than at least one threshold value is used as a boundary between groups,
      managing the pieces of information in form of a binary tree structure, and
      comparing, with the threshold value, a ratio between a standard deviation of intervals among times represented by time information included in information in a node of interest and a deviation of intervals among time information of child nodes having the node of interest as a parent node, the arithmetic means performs grouping so that pieces of information in the child nodes are handled as pieces of information in different groups or as information in a single group,
   wherein the arithmetic means uses a plurality of the at least one threshold value for the same pieces of information acquired by the acquisition means to obtain a plurality of grouped results which respectively have different finenesses.

2. The information processing apparatus according to claim 1, wherein, when the pieces of information are images, the time information represents image-capture times.

3. The information processing apparatus according to claim 1, further comprising:
   a display control means for displaying, on the basis of the groups obtained by the arithmetic means, in a list form, pieces of information which belong to each group.

4. The information processing apparatus according to claim 3, wherein the display control means respectively displays the groups in the form of folders, and displays, in a list form, pieces of information which belong to a group represented by a folder selected by a user from the displayed folders.

5. The information processing apparatus according to claim 4, further comprising:
   a setting means for setting, as a name for each of the folders, a name input by the user or a name obtained from attribute information included in information belonging to each of the groups.

6. An information processing method comprising:
   acquiring, by using a computer, a plurality of pieces of information to be grouped, the pieces of information including time information as attribute information;
   grouping the acquired pieces of information so that a portion in which a level of variation of intervals among times represented by the time information included in the pieces of information is greater than at least one threshold value is used as a boundary between groups;
   managing the grouped acquired pieces of information in form of a binary tree structure;
   comparing, with the threshold value, a ratio between a standard deviation of intervals among times represented by time information included in information in a node of interest and a deviation of intervals among time information of child nodes having the node of interest as a parent node, the grouping the acquired pieces of information groups the information so that pieces of information in the child nodes are handled as pieces of information in different groups or as information in a single group; and
   using a plurality of the at least one threshold value for the acquired pieces of information to obtain a plurality of grouped results which respectively have different finenesses.

7. A computer-readable storage medium having computer-readable program code stored therein, the computer-readable program code, when executed by a computer, causing the computer to execute processing comprising:
   acquiring a plurality of pieces of information to be grouped, the pieces of information including time information as attribute information;
   grouping the acquired pieces of information so that a portion in which a level of variation of intervals among times represented by the time information included in the pieces of information is greater than at least one threshold value is used as a boundary between groups;
   managing the grouped acquired pieces of information in form of a binary tree structure, and
   comparing, with the threshold value, a ratio between a standard deviation of intervals among times represented by time information included in information in a node of interest and a deviation of intervals among time information of child nodes having the node of interest as a parent node, the grouping the acquired pieces of information groups the information so that pieces of information in the child nodes are handled as pieces of information in different groups or as information in a single group; and
   using a plurality of the at least one threshold value for the acquired pieces of information to obtain a plurality of grouped results which respectively have different finenesses.

8. An information processing apparatus comprising:
   a processor; memory;
   an acquisition unit configured to acquire a plurality of pieces of information to be grouped, the pieces of information including time information as attribute information; and
   an arithmetic unit configured to:
      group the pieces of information acquired by the acquisition unit so that a portion in which a level of variation of intervals among times represented by the time information included in the pieces of information is greater than at least one threshold value is used as a boundary between groups,
      manage the pieces of information in form of a binary tree structure, and
      compare, with the threshold value, a ratio between a standard deviation of intervals among times represented by time information included in information in a node of interest and a deviation of intervals among time information of child nodes having the node of interest as a parent node, the arithmetic unit performs grouping so that pieces of information in the child nodes are handled as pieces of information in different groups or as information in a single group,
   wherein the arithmetic unit uses a plurality of the at least one threshold value for the same pieces of information acquired by the acquisition unit to obtain a plurality of grouped results which respectively have different finenesses.

* * * * *